(12) United States Patent
Chondroudis et al.

(10) Patent No.: US 7,662,740 B2
(45) Date of Patent: Feb. 16, 2010

(54) PLATINUM-CHROMIUM-COPPER/NICKEL FUEL CELL CATALYST

(75) Inventors: Konstantinos Chondroudis, Thessaloniki (GR); Alexander Gorer, San Jose, CA (US); Martin Devenney, Mountain View, CA (US); Ting He, Dublin, OH (US); Hiroyuki Oyanagi, Saitama (JP); Daniel M. Giaquinta, Saratoga, CA (US); Kenta Urata, Utsunomiya (JP); Hiroichi Fukuda, Utsunomiya (JP); Qun Fan, Pleasanton, CA (US); Peter Strasser, Houston, TX (US); Keith James Cendak, San Mateo, CA (US); Jennifer N. Cendak, legal representative, San Mateo, CA (US)

(73) Assignees: Symyx Technologies, Inc., Santa Clara, CA (US); Honda Giken Kogyo Kabushiki Kaisha, Minato-Ku, Tokyo (JP)

( * ) Notice: Subject to any disclaimer, the term of this patent is extended or adjusted under 35 U.S.C. 154(b) by 267 days.

(21) Appl. No.: 10/559,637

(22) PCT Filed: Jun. 3, 2004

(86) PCT No.: PCT/US2004/017333

§ 371 (c)(1),
(2), (4) Date: Jun. 15, 2006

(87) PCT Pub. No.: WO2005/001967

PCT Pub. Date: Jan. 6, 2005

(65) Prior Publication Data

US 2006/0251952 A1 Nov. 9, 2006

Related U.S. Application Data

(60) Provisional application No. 60/475,559, filed on Jun. 3, 2003.

(51) Int. Cl.
| | |
|---|---|
| *B01J 21/18* | (2006.01) |
| *B01J 23/00* | (2006.01) |
| *B01J 23/40* | (2006.01) |
| *B01J 23/74* | (2006.01) |
| *B01J 25/00* | (2006.01) |
| *C22C 19/05* | (2006.01) |
| *C22C 19/03* | (2006.01) |
| *C22C 5/04* | (2006.01) |
| *C22C 9/06* | (2006.01) |
| *C22C 9/00* | (2006.01) |
| *C22C 30/02* | (2006.01) |
| *C22C 30/00* | (2006.01) |
| *C22C 27/06* | (2006.01) |

(52) U.S. Cl. ............... 502/180; 502/182; 502/185; 502/301; 420/442; 420/444; 420/456; 420/457; 420/468; 420/485; 420/497; 420/582; 420/583; 420/584.4; 420/587; 420/588; 420/428; 420/466; 420/441; 420/443; 420/445; 420/446; 420/447; 420/448; 420/449; 420/450; 420/451; 420/452; 420/453; 420/454; 420/455; 420/458; 420/459; 420/460; 420/469; 420/580

(58) Field of Classification Search ............... 502/180, 502/182, 185, 301; 420/468, 485, 497, 582, 420/583, 584.4, 587, 588, 428, 466, 441–460, 420/469, 580
See application file for complete search history.

(56) References Cited

U.S. PATENT DOCUMENTS

| | | | | |
|---|---|---|---|---|
| 3,915,898 | A * | 10/1975 | Acres et al. | 502/315 |
| 3,925,259 | A | 12/1975 | Kane | |
| 4,668,310 | A * | 5/1987 | Kudo et al. | 148/304 |
| 4,716,087 | A * | 12/1987 | Ito et al. | 429/40 |
| 4,717,774 | A * | 1/1988 | Narayan et al. | 564/422 |
| 4,806,515 | A * | 2/1989 | Luczak et al. | 502/185 |

| | | | | |
|---|---|---|---|---|
| 4,954,474 | A | * 9/1990 | Tsurumi et al. | 502/185 |
| 5,068,161 | A | 11/1991 | Keck et al. | |
| 5,096,866 | A | * 3/1992 | Itoh et al. | 502/101 |
| 5,126,216 | A | 6/1992 | Capuano et al. | |
| 5,767,036 | A | * 6/1998 | Freund et al. | 502/185 |
| 5,876,867 | A | * 3/1999 | Itoh et al. | 429/44 |
| 6,045,671 | A | 4/2000 | Wu et al. | |
| 6,048,633 | A | 4/2000 | Fujii et al. | |
| 6,127,058 | A | 10/2000 | Pratt et al. | |
| 6,187,164 | B1 | 2/2001 | Warren et al. | |
| 6,187,468 | B1 | 2/2001 | Shinkai et al. | |
| 6,255,011 | B1 | 7/2001 | Fujii et al. | |
| 6,268,077 | B1 | 7/2001 | Kelley et al. | |
| 6,294,280 | B1 | 9/2001 | Tanaka et al. | |
| 6,309,758 | B1 | * 10/2001 | Schmidt | 428/570 |
| 6,730,350 | B2 | 5/2004 | Finkelshtain et al. | |
| 2003/0008197 | A1 | 1/2003 | Gorer | |
| 2004/0142230 | A1 | * 7/2004 | Katori et al. | 429/42 |

FOREIGN PATENT DOCUMENTS

| | | | |
|---|---|---|---|
| DE | 3026777 | * | 7/1980 |
| EP | 0330627 A1 | | 8/1989 |
| EP | 0469514 A2 | | 2/1992 |
| EP | 0743092 A1 | | 11/1996 |
| EP | 0827225 A2 | | 3/1998 |
| EP | 1080435 B1 | | 3/2001 |
| JP | 63-190253 | * | 8/1988 |
| JP | 1988-190253 | * | 8/1988 |
| WO | WO 99/16137 | | 4/1999 |

OTHER PUBLICATIONS

"Effect of reduction conditions on electocatalytic activity of a ternary PtNiCr/C catalyst for methanol electro-oxidation," Min Ku Jeon et al. Electrochimia Acta 54 (2009), pp. 2837-2842.*

Chu, D. et al.—J. Electrochem. Soc. 1996, 143, 1685.

Ralph, T.R. et al.—Catalysts for Low Temperature Fuel Cells Part 1: The Cathode Challenges, Platinum Metals Rev., 2002, 46, (1), pp. 3-14.

Schmidt et al.—Characterization of high-surface-area electrocatalysts using a rotating disk electrode configuration, Journal of the Electrochemical Society, 1998, 145(7), pp. 2354-2358.

Schmidt et al.—Rotating disk electrode measurements on the CO tolerance of a high-surface area Pt/Vulcan carbon fuel cell electrocatalyst, Journal of the Electrochemical Society, 1999, 146(4), pp. 1296-1304.

Strasser, P. et al.—Combinatorial Electrochemical Strategies For the Discovery of New Fuel-Cell Electrode Materials, Proceedings of the International Symposium on Fuel Cells for Vehicles, 41st Battery Symposium, The Electrochemical Society of Japan, Nagoya 2000, pp. 34-35.

Strasser, P. et al.—Combinatorial Electrochemical Techniques for the Discovery of New Fuel-Cell Cathode Materials, 2001, vol. 2001-4, Direct Methanol Fuel Cells, Proceedings of the Electrochemical Society, New Jersey, Zawodzinski, T., eds, pp. 191-208.

Yasuda et al.—Polymerization-Pressure Dependencies of Properties of Perfluorosulfonate Cation-Exchanger Thin Films by Plasma Polymerization, Ber. Bunsenges. Phys. Chem., 1994, vol. 98, pp. 631-635.

International Search Report for Application No. PCT/US2004/017333 dated Nov. 12, 2004, 3pages.

* cited by examiner

*Primary Examiner*—Patricia L Hailey

(74) *Attorney, Agent, or Firm*—Senniger Powers LLP

(57) ABSTRACT

A fuel cell catalyst comprising platinum, chromium, and copper, nickel or a combination thereof. In one or more embodiments, the concentration of platinum is less than 50 atomic percent, and/or the concentration of chromium is less than 30 atomic percent, and/or the concentration of copper, nickel, or a combination thereof is at least 35 atomic percent.

26 Claims, 3 Drawing Sheets

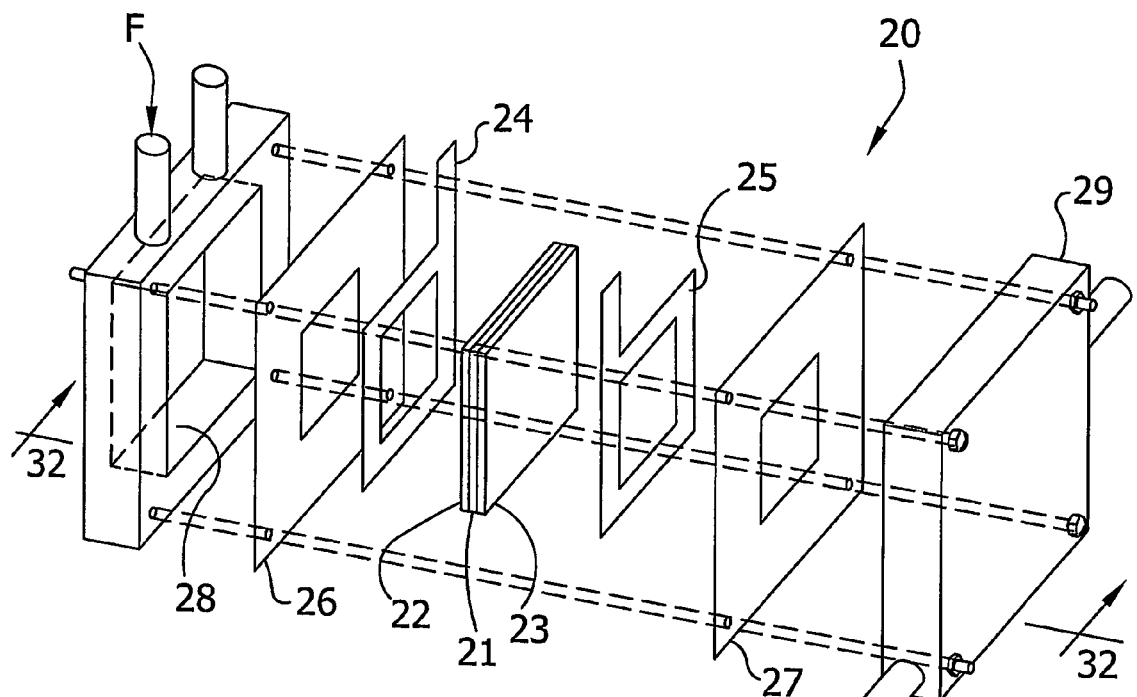
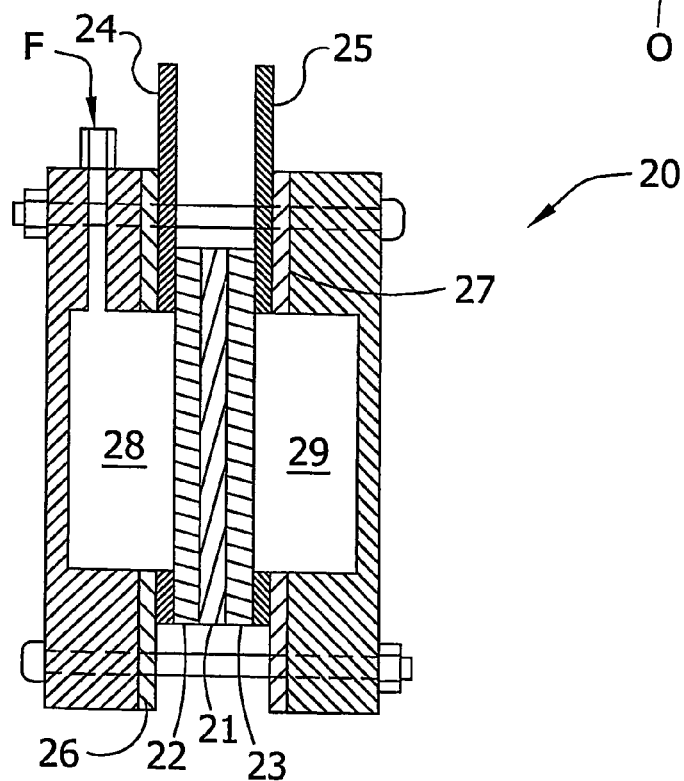

PLATINUM-CHROMIUM-COPPER/NICKEL FUEL CELL CATALYST

CROSS-REFERENCE TO RELATED APPLICATIONS

This application is a 35 U.S.C. §371 application of PCT/US2004/017333, filed on Jun. 3, 2004, which claims priority from U.S. Provisional Patent Application Ser. No. 60/475,559, filed Jun. 3, 2003. The entire contents of these related applications are hereby incorporated by reference herein.

BACKGROUND OF THE INVENTION

1. Field of the Invention

The present invention relates to catalysts which are useful in fuel cell electrodes (e.g., electrocatalysts) and other catalytic structures, and which comprise platinum, chromium and copper, nickel or a combination of copper and nickel.

2. Description of Related Technology

A fuel cell is an electrochemical device for directly converting the chemical energy generated from an oxidation-reduction reaction of a fuel such as hydrogen or hydrocarbon-based fuels and an oxidizer such as oxygen gas (in air) supplied thereto into a low-voltage direct current. Thus, fuel cells chemically combine the molecules of a fuel and an oxidizer without burning, dispensing with the inefficiencies and pollution of traditional combustion.

A fuel cell is generally comprised of a fuel electrode (anode), an oxidizer electrode (cathode), an electrolyte interposed between the electrodes (alkaline or acidic), and means for separately supplying a stream of fuel and a stream of oxidizer to the anode and the cathode, respectively. In operation, fuel supplied to the anode is oxidized, releasing electrons that are conducted via an external circuit to the cathode. At the cathode, the supplied electrons are consumed when the oxidizer is reduced. The current flowing through the external circuit can be made to do useful work.

There are several types of fuel cells, including those having electrolytes of phosphoric acid, molten carbonate, solid oxide, potassium hydroxide, or a proton exchange membrane. A phosphoric acid fuel cell operates at about 160-220° C., and preferably at about 190-200° C. This type of fuel cell is currently being used for multi-megawatt utility power generation and for co-generation systems (i.e., combined heat and power generation) in the 50 to several hundred kilowatts range. In contrast, proton exchange membrane fuel cells use a solid proton-conducting polymer membrane as the electrolyte. Typically, the polymer membrane is maintained in a hydrated form during operation in order to prevent loss of ionic conduction which limits the operation temperature typically to between about 70 and about 120° C. depending on the operating pressure, and preferably below about 100° C. Proton exchange membrane fuel cells have a much higher power density than liquid electrolyte fuel cells (e.g., phosphoric acid), and can vary output quickly to meet shifts in power demand. Thus, they are suited for applications such as in automobiles and small-scale residential power generation where quick startup is a consideration.

In some applications (e.g., automotive), pure hydrogen gas is the optimum fuel; however, in other applications where a lower operational cost is desirable, a reformed hydrogen-containing gas is an appropriate fuel. A reformed-hydrogen containing gas is produced, for example, by steam-reforming methanol and water at 200-300° C. to a hydrogen-rich fuel gas containing carbon dioxide. Theoretically, the reformate gas consists of 75 vol % hydrogen and 25 vol % carbon dioxide. In practice, however, this gas also contains nitrogen, oxygen and, depending on the degree of purity, varying amounts of carbon monoxide (up to 1 vol %). Although some electronic devices also reform liquid fuel to hydrogen, in some applications the conversion of a liquid fuel directly into electricity is desirable, as then high storage density and system simplicity are combined. In particular, methanol is an especially desirable fuel because it has a high energy density, a low cost, and is produced from renewable resources.

For the oxidation and reduction reactions in a fuel cell to proceed at useful rates, especially at operating temperatures below about 300° C., electrocatalyst materials are typically provided at the electrodes. Initially, fuel cells used electrocatalysts made of a single metal, usually platinum (Pt), palladium (Pd), rhodium (Rh), iridium (Ir), osmium (Os), silver (Ag) or gold (Au), because they are able to withstand the corrosive environment. In general, platinum is considered to be the most efficient and stable single-metal electrocatalyst for fuel cells operating below about 300° C.

While the above-noted elements were first used in fuel cells in metallic powder form, later techniques were developed to disperse these metals over the surface of electrically conductive supports (e.g., carbon black) to increase the surface area of the electrocatalyst. An increase in the surface area of the electrocatalyst in turn increased the number of reactive sites, leading to improved efficiency of the cell. Nevertheless, fuel cell performance typically declines over time because the presence of electrolyte, high temperatures and molecular oxygen dissolve the electrocatalyst and/or sinter the dispersed electrocatalyst by surface migration or dissolution/re-precipitation.

Although platinum is considered to be the most efficient and stable single-metal electrocatalyst for fuel cells, it is costly. Additionally, an increase in electrocatalyst activity over platinum is desirable, if not necessary, for wide-scale commercialization of fuel cell technology. However, the development of cathode fuel cell electrocatalyst materials faces longstanding challenges. The greatest challenge is the improvement of the electrode kinetics of the oxygen reduction reaction. In fact, sluggish electrochemical reaction kinetics have prevented attaining the thermodynamic reversible electrode potential for oxygen reduction. This is reflected in exchange current densities of around $10^{-10}$ to $10^{-12}$ A/cm$^2$ for oxygen reduction on, for example, Pt at low and medium temperatures. A factor contributing to this phenomenon includes the fact that the desired reduction of oxygen to water is a four-electron transfer reaction and typically involves breaking a strong O—O bond early in the reaction. In addition, the open circuit voltage is lowered from the thermodynamic potential for oxygen reduction due to the formation of peroxide and possible platinum oxides that inhibit the reaction. A second challenge is the stability of the oxygen electrode (cathode) during long-term operation. Specifically, a fuel cell cathode operates in a regime in which even the most unreactive metals are not completely stable. Thus, alloy compositions that contain non-noble metal elements may have a rate of corrosion that would negatively impact the projected lifetime of a fuel cell. The corrosion may be more severe when the cell is operating near open circuit conditions (which is the most desirable potential for thermodynamic efficiency).

Electrocatalyst materials at the anode also face challenges during fuel cell operation. Specifically, as the concentration of carbon monoxide (CO) rises above about 10 ppm in the fuel the surface of the electrocatalyst can be rapidly poisoned. As a result, platinum (by itself) is a poor electrocatalyst if the fuel stream contains carbon monoxide (e.g., reformed-hydrogen gas typically exceeds 100 ppm). Liquid hydrocarbon-based fuels (e.g., methanol) present an even greater poisoning problem. Specifically, the surface of the platinum becomes blocked with the adsorbed intermediate, carbon monoxide (CO). It has been reported that $H_2O$ plays a key role in the removal of such poisoning species in accordance with the following reactions:

$$Pt+CH_3OH \rightarrow Pt\text{---}CO+4H^++4e^- \quad (1);$$

$$Pt+H_2O \rightarrow Pt\text{---}OH+H^++e^- \quad (2); \text{ and}$$

$$Pt\text{---}CO+Pt\text{---}OH \rightarrow 2Pt+CO_2+H^++e^- \quad (3).$$

As indicated by the foregoing reactions, the methanol is adsorbed and partially oxidized by platinum on the surface of the electrode (1). Adsorbed OH, from the hydrolysis of water, reacts with the adsorbed CO to produce carbon dioxide and a proton (2,3). However, platinum does not form OH species well at the potentials fuel cell electrodes operate (e.g., 200 mV-1.5 V). As a result, step (3) is the slowest step in the sequence, limiting the rate of CO removal, thereby allowing poisoning of the electrocatalyst to occur. This applies in particular to a proton exchange membrane fuel cell which is especially sensitive to CO poisoning because of its low operating temperatures.

One technique for increasing electrocatalytic cathodic activity during the reduction of oxygen and electrocatalytic anodic activity during the oxidation of hydrogen is to employ an electrocatalyst which is more active, corrosion resistant, and/or more poison tolerant. For example, increased tolerance to CO has been reported by alloying platinum and ruthenium at a 50:50 atomic ratio (see, D. Chu and S. Gillman, J. Electrochem. Soc. 1996, 143, 1685). The electrocatalysts proposed to date, however, leave room for further improvement.

BRIEF SUMMARY OF THE INVENTION

Briefly, therefore, the present invention is directed to a catalyst for use in oxidation or reduction reactions, the catalyst comprising platinum, chromium at a concentration that is no greater than 30 atomic percent, and copper, nickel, or a combination thereof at a concentration that is at least 35 atomic percent.

The present invention is also directed to a catalyst for use in oxidation or reduction reactions, the catalyst comprising platinum, chromium, and copper, nickel, or a combination thereof, wherein the concentration of copper, nickel, or a combination thereof is at least 45 atomic percent.

The present invention is also directed to a catalyst for use in oxidation or reduction reactions, the catalyst comprising platinum, chromium, copper and nickel.

The present invention is also directed to a catalyst for use in oxidation or reduction reactions, the catalyst comprising platinum, chromium, and copper, wherein the concentration of chromium is no greater than 30 atomic percent.

The present invention is also directed to a catalyst for use in oxidation or reduction reactions, the catalyst comprising platinum, chromium, and nickel, wherein the concentration of nickel is at least 35 atomic percent.

The present invention is also directed to a catalyst for use in oxidation or reduction reactions, the catalyst comprising platinum, chromium, and nickel, wherein the concentration of platinum is less than 40 atomic percent.

The present invention is also directed to a catalyst for use in oxidation or reduction reactions, the catalyst comprising platinum at a concentration that is between about 15 and about 50 atomic percent, chromium at a concentration that is between about 5 and about 45 atomic percent, and copper at a concentration that is between about 15 and about 50 atomic percent.

The present invention is also directed to one or more of the foregoing catalysts wherein said catalyst comprises an alloy of the recited metals, or alternatively wherein said catalyst consists essentially of an alloy of the recited metals.

The present invention is also directed to a supported electrocatalyst powder for use in electrochemical reactor devices, the supported electrocatalyst powder comprising one of the foregoing catalysts and electrically conductive support particles upon which the catalyst is dispersed.

The present invention is also directed to a fuel cell electrode, the fuel cell electrode comprising electrocatalyst particles and an electrode substrate upon which the electrocatalyst particles are deposited, the electrocatalyst particles comprising one of the foregoing catalysts.

The present invention is also directed to a fuel cell comprising an anode, a cathode, a proton exchange membrane between the anode and the cathode, and one of the foregoing catalysts for the catalytic oxidation of a hydrogen-containing fuel or the catalytic reduction of oxygen.

The present invention is also directed to a method for the electrochemical conversion of a hydrogen-containing fuel and oxygen to reaction products and electricity in a fuel cell comprising an anode, a cathode, a proton exchange membrane therebetween, one of the foregoing catalysts, and an electrically conductive external circuit connecting the anode and cathode, the method comprising contacting the hydrogen-containing fuel or the oxygen and the catalyst to catalytically oxidize the hydrogen-containing fuel or catalytically reduce the oxygen.

The present invention is also directed to a fuel cell electrolyte membrane, or a fuel cell electrode, having an unsupported catalyst layer on a surface thereof, said unsupported catalyst layer comprising a catalyst having any one of the foregoing compositions.

The foregoing and other features and advantages of the present invention will become more apparent from the following description and accompanying drawing.

BRIEF DESCRIPTION OF THE DRAWINGS

FIG. 2 is an exploded, schematic structural view showing members of a fuel cell.

FIG. 3 is a cross-sectional view of the assembled fuel cell of FIG. 2.

It is to be noted that corresponding reference characters indicate corresponding parts throughout the drawings.

DETAILED DESCRIPTION OF THE INVENTION

General Discussion

Figure 1:
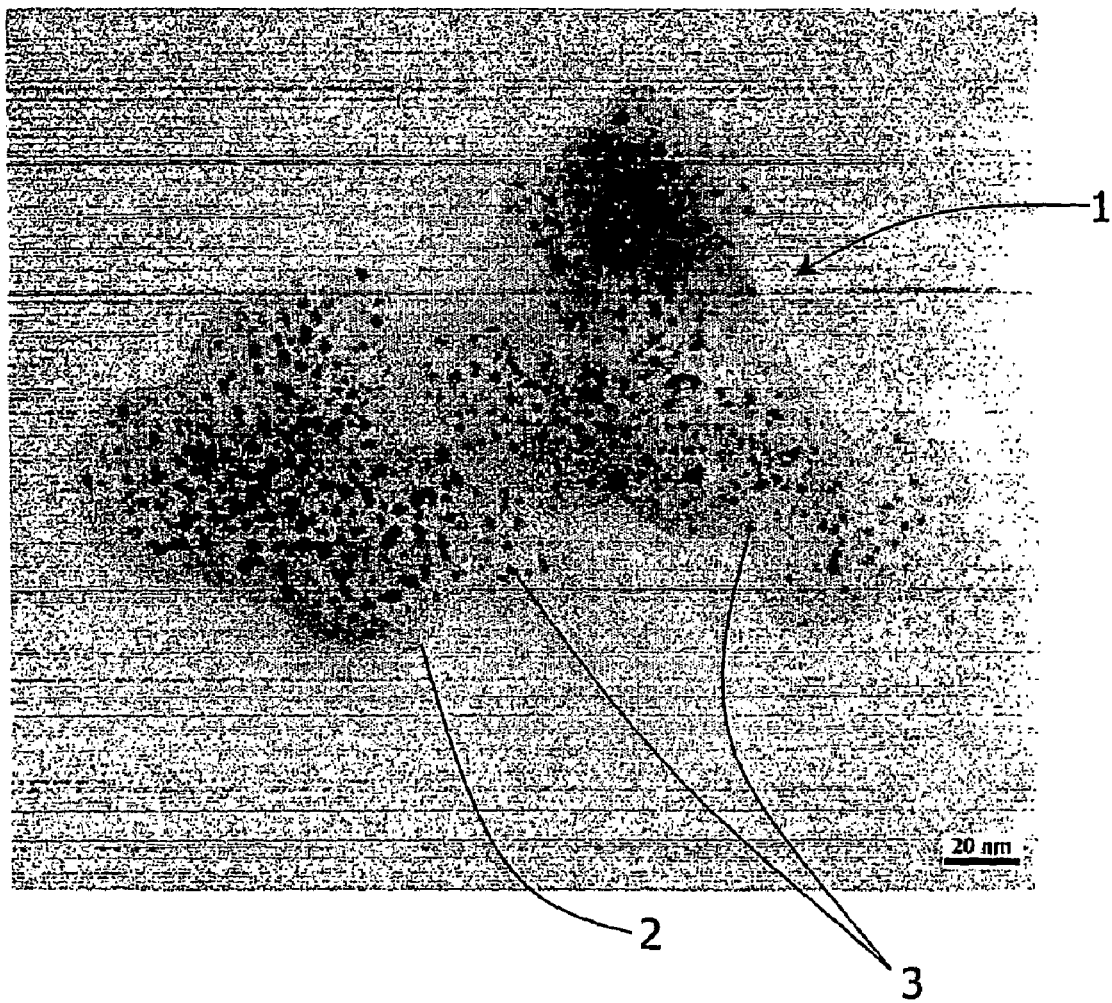
FIG. 1 is a photograph of a TEM image of a carbon support with catalyst nanoparticles deposited thereon, in accordance with the present invention.

The present invention is directed to a metal-containing substance having catalytic activity for use in, for example, a polyelectrolyte membrane fuel cell (e.g., an electrocatalyst). In particular, the present invention is directed to a metal-containing substance comprising, as further detailed herein, platinum, chromium, and one or a combination of nickel and copper, which has catalytic activity in oxidation and/or reduction reactions of interest.

In this regard it is to be noted that, in general, it is desirable, but not essential, to reduce the cost of a catalyst to be used in such reactions, particularly when used in fuel cells. One method of reducing the cost is to decrease the amount of noble metals (such as platinum) used to produce the catalyst. Typically, however, as the concentrations of noble metals are decreased, catalyst compositions tend to become more susceptible to corrosion and/or the absolute activity may be diminished. Thus, it is typically desirable to achieve the most activity per weight percent of noble metals (see, e.g., End Current Density/Weight Fraction of Platinum, as set forth in Tables A-E, infra). Preferably, this is accomplished without compromising, for example, the life cycle of the fuel cell in which the catalyst is placed. In addition to, or as an alternative to, reducing cost by limiting the noble metal concentration, a catalyst composition of the present invention may be selected because it represents an improvement in corrosion resistance and/or activity compared to platinum (e.g., at least a 3 times increase in catalytic activity compared to platinum).

The present invention is thus directed to a metal-containing substance that has catalytic activity in an oxidation and/or reduction reaction, and that comprises platinum, chromium, and copper, nickel, or a combination thereof. Optionally, the catalyst of the present invention may be in the form of an alloy of these metals, or alternatively it may comprise these metals, a portion of which is in the form of an alloy. Furthermore, this catalyst comprises amounts of platinum, chromium, and copper, nickel, or a combination thereof, which are sufficient for the metals, present therein, to play a role in the catalytic activity and/or crystallographic structure of the catalyst. Stated another way, the concentrations of platinum, chromium, and copper, nickel, or a combination thereof, in the present catalyst are such that the presence of the metals would not be considered an impurity therein. For example, when present, the concentrations of each of platinum, chromium, and copper, nickel, or a combination thereof are at least about 0.1, 0.5, 1, or even 2 atomic percent. Advantageously and surprisingly, it has been discovered that the catalysts of the present invention may exhibit favorable electrocatalytic activity while having reduced amounts of platinum, as compared to, for example, a platinum standard.

It is to be noted that, in one or more embodiments of the present invention, platinum, chromium, and copper, nickel, or a combination thereof are substantially in their metallic oxidation states. Stated another way, the average oxidation states of the foregoing catalyst elements or components are at or near zero. Although there may be portions of the catalyst wherein the oxidation states of one or more of platinum, chromium, and copper, nickel, or a combination thereof is greater than zero, the average oxidation state of each of these elements throughout the entire catalyst is less than the lowest commonly occurring oxidation state for that particular element (e.g., the lowest commonly occurring oxidation state for platinum, chromium, copper, and/or nickel is 1). Therefore, in such embodiments, the average oxidation states of platinum, chromium, copper and/or nickel may, in order of increasing preference, be less than about 1, 0.5, 0.1, or 0.01, or even zero.

It is to be further noted that the catalyst of the present invention may optionally consist essentially of the platinum, chromium, and copper, nickel, or a combination thereof (e.g., impurities that play little if any role in the catalytic activity and/or crystallographic structure of the catalyst may be present to some degree). Stated another way, the concentration of a metallic or non-metallic element or component of the catalyst, other than platinum, chromium, and copper, nickel, or a combination thereof, may optionally not exceed what would be considered an impurity (e.g., less than 1, 0.5, 0.1, 0.01 atomic percent, or less).

Constituent Concentrations

As previously disclosed, the catalyst of the present invention comprises platinum. Preferably, the catalyst comprises less than about 40 atomic percent of platinum. More preferably, the concentration of platinum is no more than about 35 atomic percent. Still more preferably, the concentration of platinum is no more than about 30 atomic percent. At the other end of the platinum concentration range, it is preferred that the metal-containing substance comprises at least about 5 atomic percent platinum. More preferably the concentration of platinum is at least about 10 atomic percent. Still more preferably, the concentration of platinum is at least about 15 atomic percent. Still more preferably, the concentration of platinum is at least about 20 atomic percent. Accordingly, the concentration of platinum may, in some embodiments, be between a minimum platinum concentration and a maximum platinum concentration, wherein the minimum platinum concentration is selected from the group consisting of about 5, 10, 15 and 20 atomic percent, and the maximum platinum concentration is selected from the group consisting of about 40, 35, and 30 atomic percent (e.g., a concentration between about 5 and about 30 atomic percent, or between about 10 and about 35 atomic percent, or between about 15 and about 40 atomic percent). Preferably, the concentration of platinum is at least about 5 atomic percent and less than about 40 atomic percent. More preferably, the concentration of platinum is at least about 10 atomic percent and no more than about 35 atomic percent. Still more preferably, the concentration of platinum is at least about 15 atomic percent and no more than about 30 atomic percent.

It is to be noted, however, that the scope of the present invention is intended to encompass all of the various platinum concentration range permutations possible herein. For example, in an alternative embodiment, the catalyst of the present invention may comprise at least about 5, about 10, about 15, about 20, about 25, about 30, or about 35 atomic percent platinum, at while the other end of the concentration range the catalyst may comprise no more than about 65, about 50, about 40, about 35, or even about 30 atomic percent platinum. Accordingly, the concentration of platinum may, in such embodiments, be between about 5 and about 65 atomic percent, between about 15 and about 40 or 50 atomic percent, between about 20 and about 40 atomic percent, between about 20 and about 35 atomic percent, or between about 20 and about 30 atomic percent, or alternatively between about 30 and about 60 atomic percent, or between about 35 and about 50 atomic percent.

Like platinum, the concentration of chromium may vary among the many embodiments of the invention disclosed herein. Preferably, however, the chromium concentration is at least about 1 atomic percent. More preferably, the concentration of chromium is at least about 5 atomic percent. Still more preferably, the concentration of chromium is at least about 10 atomic percent. At the other end of the concentration range, it is generally preferred that the concentration of chromium is no more than about 55 atomic percent, more preferably no more than about 50 atomic percent, still more preferably no more than about 45 atomic percent, still more preferably no more than about 40 atomic percent, still more preferably no more than about 35 atomic percent, still more preferably no more than about 30 atomic percent, still more preferably no more than about 25 atomic percent, and still more preferably no more than about 20 atomic percent. Accordingly, the concentration of chromium may, in some embodiments, be between about 1 and about 40 atomic percent, between about 1 and about 30 atomic percent, between about 5 and about 25 atomic percent, or between about 10 and about 20 atomic percent. Alternatively, the concentration of chromium may range, in some embodiments, between about 1 and about 55 atomic percent, between about 1 and about 50 atomic percent, between about 5 and about 45 atomic percent, or between about 5 and about 35 atomic percent.

The concentration of copper, nickel or a combination thereof may also vary among the many embodiments of the invention disclosed herein. Preferably, however, this concentration is at least about 10, about 15, about 20, about 25, about 30, or even about 35 atomic percent. More preferably, the concentration of copper, nickel, or a combination thereof is at least about 45 atomic percent. Still more preferably, this concentration is at least about 50 atomic percent. At the other end of this concentration range, it is generally preferred that the concentration of copper, nickel or a combination thereof is no more than about 80 atomic percent. More preferably, this concentration is no more than about 70 atomic percent. Still more preferably, this concentration is no more than about 65 atomic percent. Accordingly, the concentration of copper, nickel, or a combination thereof may, in some embodiments, be between at least about 35 and about 80 atomic percent, between about 45 and about 80 atomic percent, between about 45 and about 70 atomic percent, or between about 50 and about 65 atomic percent. Alternatively, the concentration of copper, nickel or a combination thereof may, in some embodiments, be between at least about 10 and about 65 atomic percent, between about 15 and about 50 atomic percent, or between about 20 and about 45 atomic percent.

In view of the foregoing, in one preferred embodiment of the present invention, the catalyst comprises platinum, chromium at a concentration that is no greater than about 30 atomic percent, and copper, nickel, or a combination thereof at a concentration that is at least about 35 atomic percent. In another preferred embodiment, the concentration of platinum is between about 15 and about 40 atomic percent, the concentration of chromium is between about 5 and about 25 atomic percent, and the concentration of copper, nickel or a combination thereof is between about 45 and about 70 atomic percent. In yet another preferred embodiment, the catalyst comprises platinum at a concentration that is between about 20 and about 35 atomic percent, chromium at concentration that is between about 5 and about 25 atomic percent, and copper, nickel, or a combination thereof at a concentration that is between about 50 and about 65 atomic percent. In still another preferred embodiment, the concentration of platinum is between about 20 and about 30 atomic percent, the concentration of chromium is between about 5 and about 25 atomic percent, and the concentration of copper, nickel or a combination thereof is between about 50 and about 65 atomic percent.

Other preferred embodiments include those wherein the catalyst comprises platinum, chromium, and copper, the concentration of chromium being no greater than about 30 atomic percent. In another preferred embodiment of the present invention, the catalyst comprises platinum, chromium, and nickel, the concentration of nickel being at least about 35 atomic percent. In yet another preferred embodiment of the present invention, the catalyst comprises platinum, chromium, and nickel, the concentration of platinum being less than about 40 atomic percent.

In this regard it is to be noted that in one embodiment of the present invention, and in particular in one or more of the preferred embodiments noted herein, the catalyst of the present invention may consists essentially of the foregoing metals, in their recited concentrations (i.e., impurities that play little if any role in the catalytic activity and/or crystallographic structure of the catalyst may be present to some degree). However, in some embodiments it is possible that other constituents may be present as intentional additions. In such embodiments, the total concentration of platinum, chromium, copper and/or nickel may be less than about 100 percent of the metal atoms present therein, the total concentration of platinum, chromium, copper and/or nickel being, for example, at least about 70, 80, 90, 95, or 99 atomic percent of the substance.

It is to be further noted that the foregoing compositions of the present invention are for the overall stoichiometries, or bulk stoichiometries, of a prepared catalyst prior to being subjected to an electrocatalytic reaction. That is, a reported catalyst composition (e.g., a catalyst alloy, or a catalyst comprising or consisting essentially of an alloy) is an average stoichiometry over the entire volume of the prepared catalyst composition, and therefore, localized stoichiometric variations may exist. For example, the volume of a particle of a catalyst alloy comprising the surface and the first few atomic layers inward therefrom may differ from the bulk stoichiometry. Likewise, within the bulk of the particle there may be stoichiometric variations. The surface stoichiometry corresponding to a particular bulk stoichiometry is highly dependant upon the method and conditions under which the catalyst alloy is prepared. As such, catalyst alloys having the same bulk stoichiometry may have significantly different surface stoichiometries. Without being bound to a particular theory, it is believed the differing surface stoichiometries are due at least in part to differences in the atomic arrangements, chemical phases and homogeneity of the catalysts.

Furthermore, it is to be noted that it has been reported that subjecting a catalyst composition to an electrocatalytic reaction (e.g., the operation of a fuel cell) may change the composition by leaching one or more constituents from the catalyst alloy (see, Catalysis for Low Temperature Fuel Cells Part 1: The Cathode Challenges, T. R. Ralph and M. P. Hogarth, Platinum Metals Rev., 2002, 46, (1), p. 3-14). This leaching effect may potentially act to increase the activity of the catalyst by increasing the surface area and/or by changing the surface composition of the catalyst. In fact, the purposeful leaching of catalyst compositions after synthesis to increase the surface area has been disclosed by Itoh et al. (see, e.g., U.S. Pat. No. 5,876,867). As such, it is to be noted that the catalyst alloy compositions of the present invention are intended to include starting bulk stoichiometries, any starting surface stoichiometries resulting therefrom, and modifications of the starting bulk and/or surface stoichiometries that are produced by subjecting the catalyst to an electrocatalytic reaction.

Formation of a Catalyst Comprising/Consisting Essentially of an Alloy

The catalysts of the present invention may consist essentially of an alloy of platinum, chromium, and copper, nickel or a combination thereof. Alternatively, the catalysts of the present invention may comprise an alloy of platinum, chromium, and copper, nickel or a combination thereof; that is, the catalysts of the present invention may alternatively comprise an alloy of these metals, and optionally one or more of these metals in a non-alloy form (e.g., a platinum, chromium, copper and/or nickel oxide and/or salt).

Such alloys may be formed by a variety of methods. For example, the appropriate amounts of the constituents (e.g., metals) may be mixed together and heated to a temperature above the respective melting points to form a molten solution of the metals which is cooled and allowed to solidify.

Typically, the catalysts of the present invention are used in a powder form to increase the surface area, which in turn increases the number of reactive sites, and thus leads to improved efficiency of the cell in which the catalysts are being used. Thus, a formed catalyst alloy may be transformed into a powder after being solidified (e.g., by grinding), or during solidification (e.g., spraying molten alloy and allowing the droplets to solidify). In this regard it is to be noted, however, that in some instances it may be advantageous to evaluate alloys for electrocatalytic activity in a non-powder form, as further described and illustrated elsewhere herein (see, e.g., Examples 1 and 2, infra).

To further increase surface area and efficiency, a catalyst alloy (i.e., a catalyst comprising or consisting essentially of an alloy) for use in a fuel cell may be deposited over the surface of electrically conductive supports (e.g., carbon black). One method for loading a catalyst alloy onto supports typically comprises depositing metal precursor compounds onto the supports, and converting the precursor compounds to metallic form and alloying the metals using a heat-treatment in a reducing atmosphere (e.g., an atmosphere comprising an inert gas such as argon and/or a reducing gas such as hydrogen). One method for depositing the precursor compounds involves chemical precipitation of precursor compounds onto the supports. The chemical precipitation method is typically accomplished by mixing supports and sources of the precursor compounds (e.g., an aqueous solution comprising one or more inorganic metal salts) at a concentration sufficient to obtain the desired loading of the catalyst on the supports and then precipitation of the precursor compounds is initiated (e.g., by adding an ammonium hydroxide solution). The slurry is then typically filtered from the liquid under vacuum, washed with deionized water, and dried to yield a powder that comprises the precursor compounds on the supports.

Another method for depositing the precursor compounds comprises forming a suspension comprising a solution and supports suspended therein, wherein the solution comprises a solvent portion and a solute portion that comprises the constituents of the precursor compound(s) being deposited. The suspension is frozen to deposit (e.g., precipitate) the precursor compound(s) on the support particles. The frozen suspension is freeze-dried to remove the solvent portion and leave a freeze-dried powder comprising the supports and the deposits of the precursor compound(s) on the supports.

Since the process may involve sublimation of the solvent portion from the frozen suspension, the solvent portion of the solution in which the supports are suspended preferably has an appreciable vapor pressure below its freezing point. Examples of such sublimable solvents that also dissolve many metal-containing compounds and metals include water, alcohols (e.g., methanol, ethanol, etc.), acetic acid, carbon tetrachloride, ammonia, 1,2-dichloroethane, N,N-dimethylformamide, formamide, etc.

The solution in which the supports are dispersed/suspended provides the means for delivering the metal species which is to be deposited onto the surfaces of the supports. The metal species may be the final desired form, but in many instances it is not. If the metal species is not a final desired form, the deposited metal species is a precursor of the final desired form. Examples of such precursors or metal species include inorganic and organic metal compounds such as metal halides, sulfates, carbonates, nitrates, nitrites, oxalates, acetates, formates, etc. The conversion to the final desired form may be made by thermal decomposition, chemical reduction, or other reaction. Thermal decomposition, for example, is brought about by heating a precursor to obtain a different solid material and a gaseous material. In general, as is known, thermal decomposition of halides, sulfates, carbonates, nitrates, nitrites, oxalates, acetates, and formates may be carried out at temperatures between about 200 and about 1,200° C.

A precursor is usually selected such that any unwanted by-products from the conversion can be removed from the powder product. For example, during thermal decomposition the unwanted decomposition products are typically volatilized. To yield a final product that is a catalyst alloy, the metal precursors are typically selected so that the powder comprising the deposited precursors may be reduced without significantly altering the uniformity of the metal deposits on the surface of the supports and/or without significantly altering the particle size of the final powder (e.g., through agglomeration).

Nearly any metal may be deposited onto supports by one or more of the processes noted herein, provided that the metal or compound containing the metal is capable of being dispersed or dissolved in a suitable medium (i.e., a solvent). Likewise, nearly any metal may be combined with, or alloyed with, any other metal provided the metals or metal-containing compounds are dispersible or soluble in a suitable medium.

The solute portion may comprise an organometallic compound and/or an inorganic metal-containing compound as a source of the metal species being deposited. In general, organometallic compounds are more costly, may contain more impurities than inorganic metal-containing compounds, and may require organic solvents. Organic solvents are more costly than water and typically require procedures and/or treatments to control purity or negate toxicity. As such, organometallic compounds and organic solvents are generally not preferred. Examples of appropriate inorganic salts include copper (II) nitrate trihydrate, chromium (III) nitrate nonahydrate, and nickel (II) nitrate hydrate. Such salts are highly soluble in water and, as such, water is a preferred solvent. In some instances, it is desirable for an inorganic metal-containing compound to be dissolved in an acidic solution prior to being mixed with other inorganic metal-containing compounds.

To form a catalyst alloy having a particular composition or stoichiometry, the amounts of the various metal-containing source compounds necessary to achieve that composition are determined in view thereof. If the supports have a pre-deposited metal, the loading of the pre-deposited metal on the supports is typically taken into account when calculating the necessary amounts of metal-containing source compounds. After the appropriate amounts of the metal-containing compounds are determined, the solution may be prepared by any appropriate method. For example, if all the selected metal-containing source compounds are soluble at the desired concentration in the same solvent at room temperature, they may merely be mixed with the solvent. Alternatively, the suspending solution may be formed by mixing source solutions, wherein a source solution comprises a particular metal-containing source compound at a particular concentration. If, however, all the selected compounds are not soluble at the same temperature when mixed together (either as powders into the solvent or as source solutions), the temperature of the mixture may be increased to increase the solubility limit of one or more of the source compounds so that the suspending solution may be formed. In addition to adjusting solubility with temperature, the stability of the suspending solution may be adjusted, for example, by the addition of a buffer, by the addition of a complexing agent, and/or by adjusting the pH.

In addition to varying the amounts of the various metals to form catalyst alloys having different compositions, this method allows for a wide variation in the loading of the metal onto the supports. This is beneficial because it allows for the electrocatalytic activity of a supported catalyst alloy powder (e.g., an electrocatalyst powder) to be maximized. The loading is controlled in part by adjusting the total concentration of the various metals in the solution while maintaining the relative amounts of the various metals. In fact, the concentrations of the inorganic metal-containing compounds may approach the solubility limit for the solution. Typically, however, the total concentration of inorganic metal-containing compounds in the solution is between about 0.01 and about 5 M, which is well below the solubility limit. In one embodiment, the total concentration of inorganic metal-containing compounds in the solution is between about 0.1 and about 1 M. Concentrations below the solubility limit are used because it is desirable to maximize the loading of the supported catalyst alloy without decreasing the surface area of the metal deposits. Depending, for example, on the particular composition, the size of the deposits, and the uniformity of the deposit distribution on the supports, this maximized condition is typically achieved at a loading between about 5 and about 60 weight percent. In one embodiment, the loading is between about 15 and about 45 or 55 weight percent, or between about 20 and 40 or 50 weight percent. In another embodiment the loading is about 20 weight percent, about 40 weight percent, or about 50 weight percent.

The supports upon which the metal species (e.g., metal-containing compound) is to be deposited may be of any size and composition that is capable of being dispersed/suspended in the solution during the removal of heat to precipitate the metal species. The maximum size depends on several parameters including agitation of the suspension, density of the supports, specific gravity of the solution, and the rate at which heat is removed from the system. In general, the supports are electrically conductive and are useful for supporting catalytic compounds in fuel cells. Such electrically conductive supports are typically inorganic, for example, carbon supports. However, the electrically conductive supports may comprise an organic material such as an electrically conductive polymer (see, e.g., in U.S. Pat. No. 6,730,350). Carbon supports may be predominantly amorphous or graphitic and they may be prepared commercially, or specifically treated to increase their graphitic nature (e.g., heat treated at a high temperature in vacuum or in an inert gas atmosphere) thereby increasing corrosion resistance. Carbon black support particles may have a Brunauer, Emmett and Teller (BET) surface area up to about 2000 m$^2$/g. It has been reported that satisfactory results are achieved using carbon black support particles having a high mesoporous area, e.g., greater than about 75 m$^2$/g (see, e.g., Catalysis for Low Temperature Fuel Cells Part 1: The Cathode Challenges, T. R. Ralph and M. P. Hogarth, Platinum Metals Rev., 2002, 46, (1), p. 3-14). Experimental results to date indicate that a surface area of about 500 m$^2$/g is preferred.

In another embodiment the supports have pre-deposited material thereon. For example, when the final composition of the deposits on the carbon supports is a platinum alloy, it may be advantageous to use a carbon supported platinum powder. Such powders are commercially available from companies such as Johnson Matthey, Inc., of New Jersey and E-Tek Div. of De-Nora, N.A., Inc., of Somerset, N.J. and may be selected to have a particular loading of platinum. The amount of platinum loading is selected in order to achieve the desired stoichiometry of the supported catalyst alloy. Typically, the loading of platinum is between about 5 and about 60 weight percent. In one embodiment the loading of platinum is between about 15 and 45 weight percent. The size (i.e., the maximum cross-sectional length) of the platinum deposits is typically less than about 20 nm. In other embodiments of the invention the size of the platinum deposits is less than about 10 nm, 5 nm, or 2 nm, and may be smaller. In another embodiment of the invention the size of the platinum deposits is between about 2 and about 3 nm. Experimental results to date indicate that a desirable supported platinum powder may be further characterized by having a platinum surface area of between about 150 and about 170 m$^2$/g (determined by CO adsorption), a combined carbon and platinum surface area between about 350 and about 400 m$^2$/g (determined by N$_2$ adsorption), and an average support size that is between about 100 and 300 nm.

The solution and supports are mixed according to any appropriate method to form the dispersion/suspension. Exemplary methods include magnetic stirring, insertion of a stirring structure or apparatus such as a rotor, shaking, sonication, or a combination of the foregoing methods. Provided that the supports can be adequately mixed with the solution, the relative amounts of supports and solution may vary over a wide range. For example, when preparing carbon supported electrocatalysts using an aqueous suspension comprising dissolved inorganic metal-containing compounds, the carbon supports typically comprise between about 1 and about 30 weight percent of the suspension. In other embodiments the carbon supports comprise between about 1 and about 15 weight percent of the suspension, between about 1 and about 10 weight percent of the suspension, between about 3 and about 8 weight percent of the suspension, between about 5 and about 7 weight percent of the suspension, or about 6 weight percent of the suspension.

The relative amounts of supports and solution may also be described in terms of volume ratios. In one embodiment the dispersion/suspension has a volume ratio of support particles to solution of at least about 1:10. Specifying a minimum volume ratio indicates that the volume of support particles may be increased relative to the volume of solution. In other embodiments the volume ratio is at least about 1:8, 1:5, and 1:2.

In one method of preparation, the solution and supports described or illustrated herein are mixed using sonication at a power and for a duration sufficient to form a dispersion/suspension in which the pores of the supports are impregnated with the solution and/or the supports are uniformly distributed throughout the solution. If the suspension is not uniformly mixed (i.e., the supports are not uniformly impregnated with the solution and/or the supports are not uniformly distributed throughout the solution), the deposits formed on the supports will typically be non-uniform (e.g., the loading of the metal species may vary among the supports, the size of the deposits may vary significantly on a support and/or among the supports, and/or the composition of the deposits may vary among the supports). Although a uniform mixture is generally preferred, there may be circumstances in which a non-uniform mixture is desirable.

When a freeze-drying method of preparation is employed, typically the uniformity of the suspension is maintained throughout the removal of heat from the suspension. This uniformity may be maintained by continuing the mixing of the suspension as it is being cooled. In one embodiment, however, the uniformity is maintained by the viscosity of the dispersion/suspension. The actual viscosity needed to suspend the support particles uniformly depends in large part on the amount of support particles in the dispersion/suspension and the size of the support particles. To a lesser degree, the necessary viscosity depends on the density of the supports and the specific gravity of the solution. In general, it is typically sufficient to prevent substantial settling of the supports as the heat is being removed from the suspension to precipitate the deposits, and in one embodiment until the dispersion/suspension is frozen. The degree of settling, if any, may be determined, for example, by examining portions of the frozen suspension. Typically, substantial settling would be considered to have occurred if the concentrations of supports in any two portions vary by more than about ±10%. When preparing a carbon-supported catalyst powder in accordance with the freeze-drying method, the viscosity is typically sufficient to prevent settling for at least about 4 minutes. In other embodiments the viscosity prevents settling for at least about 10 minutes, about 30 minutes, about 1 hour, and even up to about 2 days. In another embodiment the viscosity of the dispersion/suspension is at least about 5,000 mPa·s.

Heat is removed from the dispersion/suspension so that at least a part of the solute portion separates from the solvent portion and deposits (e.g., precipitates) the metal species onto the supports and/or onto any pre-existing deposits (e.g., pre-deposited platinum or deposits formed by precipitation of incompatible solutes). If the concentration of supports in the suspension is sufficient (e.g., within the ranges set forth above) and enough heat is removed, nearly all of the metal species to be deposited is separated from the solvent portion to form deposits (e.g., precipitates) comprising the metal species on the supports. In one embodiment, heat is removed to freeze the dispersion/suspension and form a composite comprising the supports with deposits comprising the metal species on the supports within a matrix of the solvent portion in a solid state. If the concentration of the solute portion in the solution exceeds the ability of the supports to accommodate deposits of the metal species, some of the solute portion may crystallize within the matrix. If this occurs, such crystals are not considered to be a supported powder.

In one embodiment of the present invention, deposits of metal species are precursors of a catalyst alloy and the size of the metal species deposits is controlled such that the eventually formed alloy deposits are of size suitable for use as a fuel cell catalyst (e.g., 20 nm, 10 nm, 5 nm, 3 nm (30 Å), 2 nm (20 Å) or smaller). As set forth above, this may be accomplished in part by maintaining a well impregnated and uniformly distributed suspension throughout the removal of heat from the system. Additionally, this may be accomplished by rapidly removing heat from the dispersion/suspension as the compound or compounds are depositing on supports.

The rapid heat removal may be accomplished by cooling the suspension from a temperature of at least about 20° C. to a temperature below the freezing point of the solvent (e.g., at a rate of at least about 20° C./minute). In one embodiment the suspension is cooled at a rate of at least about 50° C./minute. In another embodiment the suspension is cooled at a rate between about 50 and 100° C./minute. Typically, such cooling rates freeze the suspension from a temperature such as room temperature (about 20° C.) or higher (e.g., about 100° C.) within a freezing period of not more than about 10, 5, or 3 minutes.

The heat may be removed from the dispersion/suspension by any appropriate method. For example, a container containing a volume of dispersion/suspension may be placed within a refrigeration unit such as freeze-dryer, a volume of dispersion/suspension may be contacted with a cooled surface (e.g., a plate or container), a volume of dispersion/suspension in a container may be immersed in, or otherwise contacted with, a cryogenic liquid. Advantageously, the same container may also be used during the formation of the dispersion and/or during the separation of solvent from deposited supports. In one embodiment a cover is placed over an opening of the container. Although the cover may completely prevent the escape of any solid matter from the container, in one embodiment the cover allows for a gas to exit the container and substantially prevents the supports from exiting the container. An example of such a cover includes a stretchable film (e.g., PARAFILM) having holes that are, for example, less than about 500 µm in size (maximum length across the hole).

In one embodiment the dispersion/suspension is cooled at a rate of at least about 20° C./minute by immersing a container containing the dispersion/suspension in a volume of cryogenic liquid within a cryogenic container sized and shaped so that at least about 50, 60, 70, 80, or 90 percent of the surface of the dispersion/suspension container is contacted with the cryogenic liquid. The cryogenic liquid is typically at a temperature that is at least about 20° C. below the freezing point of the solvent. Examples of suitable cryogenic liquids typically include liquid nitrogen, liquid helium, liquid argon, but even less costly media may be utilized (for example, an ice water/hydrous calcium chloride mixture can reach temperatures down to about −55° C., an acetone/dry ice mixture can reach temperatures down to about −78° C., and a diethyl ether/dry ice mixture can reach temperatures down to about −100° C.). The container may be made of nearly any type of material. Generally, the selected material does not require special handling procedures, can withstand repeated uses without structural failure (e.g., resistant to thermal shock), does not contribute impurities to the suspension (e.g., resistant to chemical attack), and is thermally conductive. For example, plastic vials made from high density polyethylene may be used.

The supports having the deposits thereon may be separated from the solvent portion by any appropriate method such as filtration, evaporation (e.g., by spray-drying), sublimation (e.g., freeze-drying), or a combination thereof. The evaporation or sublimation rate may be enhanced by adding heat (e.g., raising the temperature of the solvent) and/or decreasing the atmospheric pressure to which the solvent is exposed.

In one embodiment a frozen suspension is freeze-dried to remove the solvent portion from the frozen suspension. The freeze-drying may be carried out in any appropriate apparatus such as a LABONCO FREEZE DRY SYSTEM (Model 79480). Intuitively, one of skill in the art would typically maintain the temperature of the frozen suspension below the melting point of the solvent (i.e., the solvent is removed by sublimation) in order to prevent agglomeration of the supports. The freeze-drying process described or illustrated herein may be carried out under such conditions. Surprisingly, however, it is not critical that the solvent portion remain fully frozen. Specifically, it has been discovered that a free-flowing, and non-agglomerated powder may be prepared even if the solvent is allowed to melt, provided that the pressure within the freeze-dryer is maintained at a level that the evaporation rate of the liquid solvent is faster than the melting rate (e.g., below about 0.2 millibar, 0.000197 atm, or 20 Pa). Thus, there is typically not enough solvent in the liquid state to result in agglomeration of the supports. Advantageously, this can be used to decrease the time needed to remove the solvent portion. Removing the solvent portion results in a free-flowing and non-agglomerated supported powder that comprises the supports and deposits of the metal species on the supports.

To accomplish the conversion from precursor to metal, the powder is typically heated in a reducing atmosphere (e.g., an atmosphere containing hydrogen and/or an inert gas such as argon) at a temperature sufficient to decompose the precursor.

The temperature reached during the thermal treatment is typically at least as high as the decomposition temperature(s) for the precursor compound(s) and not so high as to result in degradation of the supports and agglomeration of the supports and/or the catalyst deposits. Typically the temperature is between about 60° C. and about 1100° C. Inorganic metal-containing compounds typically decompose at temperatures between about 600 and about 1000° C.

The duration of the heat treatment is typically at least sufficient to substantially convert the precursor compounds to the desired state. In general, the temperature and time are inversely related (i.e., conversion is accomplished in a shorter period of time at higher temperatures and vice versa). At the temperatures typical for converting the inorganic metal-containing compounds to an alloy set forth above, the duration of the heat treatment is typically at least about 30 minutes. In one embodiment, the duration is between about 1 and about 14 hours, or about 2 and about 12 hours.

Referring to FIG. 1, a carbon supported catalyst alloy powder particle 1 of the present invention, produced in accordance with the freeze-drying method described or illustrated herein, comprises a carbon support 2 and deposits 3 of the catalyst alloy on the support. A particle and a powder comprising said particles may have a loading that is up to about 90 weight percent. However, when a supported metal powder is used as a fuel cell catalyst, the loading is typically between about 5 and about 60 weight percent, and in one embodiment between about 15 and about 45 or 55 weight percent, or about 20 and about 40 or 50 weight percent (e.g., about 20 weight percent, about 40 weight percent, or about 50 weight percent). Increasing the loading to greater than about 60 weight percent does not typically result in an increase in the activity. Without being held to a particular theory, it is believed the excess loading covers a portion of the deposited metal and the covered portion cannot catalyze the desired electrochemical reaction. On the other hand, the activity of the supported catalyst typically decreases significantly if the loading is below about 5 weight percent.

This freeze-dry method may be used to produce supported catalyst alloy powders that are heavily loaded with nanoparticle deposits of a catalyst alloy that comprises one or more non-noble metals, wherein the deposits have a relatively narrow size distribution. In one embodiment the supported non-noble metal-containing catalyst alloy powder has a metal loading of at least about 20 weight percent of the powder, an average deposit size that is no greater than about 10 nm, and a deposit size distribution in which at least about 70 percent of the deposits are within about 50 and 150 percent of the average deposit size. In other embodiments the metal loading is between about 20 and about 60 weight percent, or between about 20 and about 40 weight percent. In other embodiments the average size of the catalyst alloy deposits is no greater than about 5 nm (50 Å), no greater than 3 nm (30 Å), or no greater than about 2 nm (20 Å). In another embodiment the average size of the catalyst alloy deposits is between about 3 nm and about 10 nm. In another embodiment the size distribution of the deposits is such that at least about 80 percent of the deposits are within about 75 and 125 percent of the average deposit size.

The freeze-dry method of preparing supported catalyst powders allows for superior control of the stoichiometry of the deposits because the suspension is preferably kept within a single container, the solution is not physically separated from the supports (e.g., by filtration), and freezing results in substantially all of the solute precipitating on the supports. Additionally, the deposits tend to be isolated, small, and uniformly dispersed over the surface of the supports and thereby increasing the overall catalytic activity. Still further, because filtering is not necessary, extremely fine particles are not lost and the supported metal powders produced by this method tend to have a greater surface area and activity. Also, the act of depositing the metal species on the supports is fast. For example, immersing a container of the suspension in a cryogenic liquid can solidify the suspension in about three to four minutes.

Unsupported Catalyst in Electrode/Fuel Cell Applications

It is to be noted that, in another embodiment of the present invention, the catalyst (e.g., the catalyst comprising or consisting essentially of an alloy of the metal components) may be unsupported; that is, it may be employed in the absence of a support particle. More specifically, it is to be noted that in another embodiment of the present invention a metal catalyst comprising platinum, chromium, and copper and/or nickel, may be directly deposited (e.g., sputtered) onto, for example, (i) a surface of one or both of the electrodes (e.g., the anode, the cathode or both), and/or (ii) one or both surfaces of a polyelectrolyte membrane, and/or (iii) some other surface, such as a backing for the membrane (e.g., carbon paper).

In this regard it is to be further noted that each component (e.g., metal) of the catalyst may be deposited separately, each for example as a separate layer on the surface of the electrode, membrane, etc. Alternatively, two or more components may be deposited at the same time. Additionally, when the catalyst comprises or consists essentially of an alloy of these metals, the alloy may be formed and then deposited, or the components thereof may be deposited and then the alloy subsequently formed thereon.

Deposition of the component(s) may be achieved using means known in the art, including for example known sputtering techniques (see, e.g., PCT Application No. WO 99/16137). Generally speaking, however, in one approach sputter-deposition is achieved by creating, within a vacuum chamber in an inert atmosphere, a voltage differential between a target component material and the surface onto which the target component is to be deposited, in order to dislodge particles from the target component material which are then attached to the surface of, for example, an electrode or electrolyte membrane, thus forming a coating of the target component thereon. In one embodiment, the components are deposited on a polymeric electrolyte membrane, including for example (i) a copolymer membrane of tetrafluoroethylene and perfluoropolyether sulfonic acid (such as the membrane material sold under the trademark NAFION), (ii) a perfluorinated sulfonic acid polymer (such as the membrane material sold under the trademark ACIPLEX), (iii) polyethylene sulfonic acid polymers, (iv) polyketone sulfonic acids, (v) polybenzimidazole doped with phosphoric acid, (vi) sulfonated polyether sulfones, and (vii) other polyhydrocarbon-based sulfonic acid polymers.

It is to be noted that the specific amount of each metal or component of the catalyst may be controlled independently, in order to tailor the composition to a given application. In some embodiments, however, the amount of each deposited component, or alternatively the amount of the deposited catalyst (e.g., catalyst alloy), may be less than about 5 mg/cm$^2$ of surface area (e.g., electrode surface area, membrane surface area, etc.), less than about 1 mg/cm$^2$, less than about 0.5 mg/cm$^2$, less than about 0.1 mg/cm$^2$, or even less than about 0.05 mg/cm$^2$. In other embodiments, the amount of the deposited component, or alternatively the amount of the deposited catalyst (e.g., catalyst alloy), may range from about 0.5 mg/cm$^2$ to less than about 5 mg/cm$^2$, or from about 0.1 mg/cm$^2$ to less than about 1 mg/cm$^2$.

It is to be further noted that the specific amount of each component, or the catalyst, and/or the conditions under which the component, or catalyst, are deposited, may be controlled in order to control the resulting thickness of the component, or catalyst, layer on the surface of the electrode, electrolyte membrane, etc. For example, as determined by means known in the art (e.g., scanning electron microscopy or Rutherford back scattering spectrophotometric method), the deposited layer of the component or catalyst may have a thickness ranging from several angstroms (e.g., about 2, 4, 6, 8, 10 Å or more) to several tens of angstroms (e.g., about 20, 40, 60, 80, 100 Å or more), up to several hundred angstroms (e.g., about 200, 300, 400, 500 Å or more). Additionally, after all of the components have been deposited, and optionally alloyed (or, alternatively, after the catalyst has been deposited, and optionally alloyed), the layer of the multi-component catalyst of the present invention may have a thickness ranging from several tens of angstroms (e.g., about 20, 40, 60, 80, 100 Å or more), up to several hundred angstroms (e.g., about 200, 400, 600, 800, 1000, 1500 Å or more). Thus, in different embodiments the thickness may be, for example, between about 10 and about 500 angstroms (Å), between about 20 and about 200 angstroms (Å), and between about 40 and about 100 angstroms (Å).

It is to be still further noted that in embodiments wherein a catalyst (or the components thereof) are deposited as a thin film on the surface of, for example, an electrode or electrolyte membrane, the composition of the deposited catalyst may be as previously described herein. Additionally, in other embodiments, the composition of the deposited catalyst may be other than as previously described. For example, with respect to an embodiment of an unsupported catalyst, the concentration of the chromium may be greater than 30 atomic percent. Further with respect to another embodiment of an unsupported catalyst, the concentration of copper, nickel, or a combination thereof may be less than 35 atomic percent.

Incorporation of the Catalysts in a Fuel Cell

The catalyst compositions of the present invention are particularly suited for use in proton exchange membrane fuel cells. As shown in FIGS. 2 and 3, a fuel cell, generally indicated at 20, comprises a fuel electrode (anode) 22 and an air electrode/oxidizer electrode (cathode) 23. In between the electrodes 22 and 23, a proton exchange membrane 21 serves as an electrolyte and it is usually a strongly acidic ion exchange membrane such as a perfluorosulphonic acid-based membrane. Preferably, the proton exchange membrane 21, the anode 22, and the cathode 23 are integrated into one body to minimize contact resistance between the electrodes and the proton exchange membrane. Current collectors 24 and 25 engage the anode and the cathode, respectively. A fuel chamber 28 and an air chamber 29 contain the respective reactants and are sealed by sealants 26 and 27, respectively.

In general, electricity is generated by hydrogen-containing fuel combustion (i.e., the hydrogen-containing fuel and oxygen react to form water, carbon dioxide and electricity). This is accomplished in the above-described fuel cell by introducing the hydrogen-containing fuel F into the fuel chamber 28, while oxygen O (preferably air) is introduced into the air chamber 29, whereby an electric current can be immediately transferred between the current collectors 24 and 25 through an outer circuit (not shown). Ideally, the hydrogen-containing fuel is oxidized at the anode 22 to produce hydrogen ions, electrons, and possibly carbon dioxide gas. The hydrogen ions migrate through the strongly acidic proton exchange membrane 21 and react with oxygen and electrons transferred through the outer circuit to the cathode 23 to form water. If the hydrogen-containing fuel F is methanol, it is preferably introduced as a dilute acidic solution to enhance the chemical reaction, thereby increasing power output (e.g., a 0.5 M methanol/0.5 M sulfuric acid solution).

To prevent the loss of ionic conduction in the proton exchange membranes, these typically remain hydrated during operation of the fuel cell. As a result, the material of the proton exchange membrane is typically selected to be resistant to dehydration at temperatures up to between about 100 and about 120° C. Proton exchange membranes usually have reduction and oxidation stability, resistance to acid and hydrolysis, sufficiently low electrical resistivity (e.g., <10 $\Omega \cdot cm$), and low hydrogen or oxygen permeation. Additionally, proton exchange membranes are usually hydrophilic. This ensures proton conduction (by reversed diffusion of water to the anode), and prevents the membrane from drying out thereby reducing the electrical conductivity. For the sake of convenience, the layer thickness of the membranes is typically between 50 and 200 μm. In general, the foregoing properties are achieved with materials that have no aliphatic hydrogen-carbon bonds, which, for example, are achieved by replacing hydrogen with fluorine or by the presence of aromatic structures; the proton conduction results from the incorporation of sulfonic acid groups (high acid strength). Suitable proton-conducting membranes also include perfluorinated sulfonated polymers such as NAFION and its derivatives produced by E.I. du Pont de Nemours & Co., Wilmington, Del. NAFION is based on a copolymer made from tetrafluoroethylene and perfluorovinylether, and is provided with sulfonic groups working as ion-exchanging groups. Other suitable proton exchange membranes are produced with monomers such as perfluorinated compounds (e.g., octafluorocyclobutane and perfluorobenzene), or even monomers with C—H bonds that do not form any aliphatic H atoms in a plasma polymer, which could constitute attack sites for oxidative breakdown.

The electrodes of the present invention comprise the catalyst compositions of the present invention and an electrode substrate upon which the catalyst is deposited. In one embodiment, the catalyst is directly deposited on the electrode substrate. In another embodiment, the catalyst is supported on electrically conductive supports and the supported catalyst is deposited on the electrode substrate. The electrode may also comprise a proton conductive material that is in contact with the catalyst. The proton conductive material may facilitate contact between the electrolyte and the catalyst, and may thus enhance fuel cell performance. Preferably, the electrode is designed to increase cell efficiency by enhancing contact between the reactant (i.e., fuel or oxygen), the electrolyte and the catalyst. In particular, porous or gas diffusion electrodes are typically used since they allow the fuel/oxidizer to enter the electrode from the face of the electrode exposed to the reactant gas stream (back face), and the electrolyte to penetrate through the face of the electrode exposed to the electrolyte (front face), and reaction products, particularly water, to diffuse out of the electrode.

Preferably, the proton exchange membrane, electrodes, and catalyst materials are in contact with each other. This is typically accomplished by depositing the catalyst either on the electrode, or on the proton exchange membrane, and then placing the electrode and membrane in contact. The catalysts of this invention can be deposited on either the electrode or the membrane by a variety of methods, including plasma deposition, powder application (the powder may also be in the form of a slurry, a paste, or an ink), chemical plating, and sputtering. Plasma deposition generally entails depositing a thin layer (e.g., between 3 and 50 μm, preferably between 5 and 20 μm) of an catalyst composition on the membrane using low-pressure plasma. By way of example, an organic platinum compound such as trimethylcyclopentadienylplatinum is gaseous between $10^{-4}$ and 10 mbar and can be excited using radio-frequency, microwaves, or an electron cyclotron resonance transmitter to deposit platinum on the membrane. According to another procedure, catalyst powder is distributed onto the proton exchange membrane surface and integrated at an elevated temperature under pressure. If, however, the amount of catalyst powder exceeds about 2 mg/cm$^2$, the inclusion of a binder such as polytetrafluoroethylene is common. Further, the catalyst may be plated onto dispersed small support particles (e.g., the size is typically between 20 and 200 Å, and more preferably between about 20 and 100 Å). This increases the catalyst surface area, which in turn increases the number of reaction sites leading to improved cell efficiency. In one such chemical plating process, for example, a powdery carrier material such as conductive carbon black is contacted with an aqueous solution or aqueous suspension (slurry) of compounds of metallic components constituting the alloy to permit adsorption or impregnation of the metallic compounds or their ions on or in the carrier. Then, while the slurry is stirred at high speed, a dilute solution of suitable fixing agent such as ammonia, hydrazine, formic acid, or formalin is slowly added dropwise to disperse and deposit the metallic components on the carrier as insoluble compounds or partly reduced fine metal particles.

The loading, or surface concentration, of a catalyst on the membrane or electrode is based in part on the desired power output and cost for a particular fuel cell. In general, power output increases with increasing concentration; however, there is a level beyond which performance is not improved. Likewise, the cost of a fuel cell increases with increasing concentration. Thus, the surface concentration of catalyst is selected to meet the application requirements. For example, a fuel cell designed to meet the requirements of a demanding application such as an extraterrestrial vehicle will usually have a surface concentration of catalyst sufficient to maximize the fuel cell power output. For less demanding applications, economic considerations dictate that the desired power output be attained with as little catalyst as possible. Typically, the loading of catalyst is between about 0.01 and about 6 mg/cm$^2$. Experimental results to date indicate that in some embodiments the catalyst loading is preferably less than about 1 mg/cm$^2$, and more preferably between about 0.1 and 1 mg/cm$^2$.

To promote contact between the collector, electrode, catalyst, and membrane, the layers are usually compressed at high temperature. The housings of the individual fuel cells are configured in such a way that a good gas supply is ensured, and at the same time the product water can be discharged properly. Typically, several fuel cells are joined to form stacks, so that the total power output is increased to economically feasible levels.

In general, the catalyst compositions and fuel cell electrodes of the present invention may be used to electrocatalyze any fuel containing hydrogen (e.g., hydrogen and reformated-hydrogen fuels). Also, hydrocarbon-based fuels may be used including saturated hydrocarbons such as methane (natural gas), ethane, propane and butane; garbage off-gas; oxygenated hydrocarbons such as methanol and ethanol; and fossil fuels such as gasoline and kerosene; and mixtures thereof.

To achieve the full ion-conducting property of proton exchange membranes, in some embodiments suitable acids (gases or liquids) are typically added to the fuel. For example, $SO_2$, $SO_3$, sulfuric acid, trifluoromethanesulfonic acid or the fluoride thereof, also strongly acidic carboxylic acids such as trifluoroacetic acid, and volatile phosphoric acid compounds may be used ("Ber. Bunsenges. Phys. Chem.", Volume 98 (1994), pages 631 to 635).

Fuel Cell Uses

As set forth above, the metal-containing substances of the present invention are useful as catalysts in fuel cells that generate electrical energy to perform useful work (e.g., electrocatalysts). For example, the catalyst alloy compositions may be used in fuel cells which are in electrical utility power generation facilities; uninterrupted power supply devices; extraterrestrial vehicles; transportation equipment such as heavy trucks, automobiles, and motorcycles (see, Fuji et al., U.S. Pat. No. 6,048,633; Shinkai et al., U.S. Pat. No. 6,187,468; Fuji et al., U.S. Pat. No. 6,225,011; and Tanaka et al., U.S. Pat. No. 6,294,280); residential power generation systems; mobile communications equipment such as wireless telephones, pagers, and satellite phones (see, Prat et al., U.S. Pat. No. 6,127,058 and Kelley et al., U.S. Pat. No. 6,268,077); mobile electronic devices such as laptop computers, personal data assistants, audio recording and/or playback devices, digital cameras, digital video cameras, and electronic game playing devices; military and aerospace equipment such as global positioning satellite devices; and robots.

Definitions

Activity is defined as the maximum sustainable, or steady state, current (Amps) obtained from the catalyst, when fabricated into an electrode, at a given electric potential (Volts). Additionally, because of differences in the geometric area of electrodes, when comparing different catalysts (e.g., electrocatalysts), activity is often expressed in terms of current density (A/cm$^2$).

An alloy may be described as a solid solution in which the solute and solvent atoms (the term solvent is applied to the metal that is in excess) are arranged at random, much in the same way as a liquid solution may be described. If some solute atoms replace some of those of the solvent in the structure of the latter, the solid solution may be defined as a substitutional solid solution. Alternatively, an interstitial solid solution is formed if a smaller atom occupies the interstices between the larger atoms. Combinations of the two types are also possible. Furthermore, in certain solid solutions, some level of regular arrangement may occur under the appropriate conditions resulting in a partial ordering that may be described as a superstructure. These solid solutions may have characteristics that may be distinguishable through characterization techniques such as XRD. Significant changes in XRD may be apparent due to changes in symmetry. Although the global arrangement of the metal atoms may be similar in the case of a solid solution and an ordered alloy, the relationship between the specific locations of the metal A and metal B atoms is now ordered, not random, resulting in different diffraction patterns. Further, a homogeneous alloy is a single compound comprising the constituent metals. A heterogeneous alloy comprises an intimate mixture of individual metals and/or metallic compounds (see, Structural Inorganic Chemistry, A. F. Wells, Oxford University Press, 5th Edition, 1995, chapter 29). An alloy, as defined herein, is also meant to include materials which may comprise elements which are generally considered to be non-metallic. For example, some alloys of the present invention may comprise oxygen and/or carbon in an amount(s) that a generally considered to be a low or impurity level (see, e.g., Structural Inorganic Chemistry, A. F. Wells, Oxford University Press, 5th Edition, 1995, chapter 29).

EXAMPLES

Example 1

Forming Catalysts on Individually Addressable Electrodes

The catalyst compositions set forth in Tables A-D, infra, were prepared using the combinatorial techniques disclosed in Warren et al., U.S. Pat. No. 6,187,164; Wu et al., U.S. Pat. No. 6,045,671; Strasser, P., Gorer, S. and Devenney, M., *Combinatorial Electrochemical Techniques For The Discovery of New Fuel-Cell Cathode Materials*, Nayayanan, S. R., Gottesfeld, S. and Zawodzinski, T., eds., Direct Methanol Fuel Cells, Proceedings of the Electrochemical Society, N.J., 2001, p. 191; and Strasser, P., Gorer, S. and Devenney, M., *Combinatorial Electrochemical Strategies For The Discovery of New Fuel-Cell Electrode Materials*, Proceedings of the International Symposium on Fuel Cells for Vehicles, 41st Battery Symposium, The Electrochemical Society of Japan, Nagoya 2000, p. 153. For example, an array of independent electrodes (with areas of between about 1 and 3 mm$^2$) may be fabricated on inert substrates (e.g., glass, quartz, sapphire alumina, plastics, and thermally treated silicon). The individual electrodes were located substantially in the center of the substrate, and were connected to contact pads around the periphery of the substrate with wires. The electrodes, associated wires, and contact pads were fabricated from a conducting material (e.g., titanium, gold, silver, platinum, copper or other commonly used electrode materials).

Specifically, the catalysts compositions set forth in Tables A-D were prepared using a photolithography/RF magnetron sputtering technique (GHz range) to deposit a thin film of the catalysts on arrays of 64 individually addressable electrodes. A quartz insulating substrate was provided and photolithographic techniques were used to design and fabricate the electrode patterns on it. By applying a predetermined amount of photoresist to the substrate, photolyzing preselected regions of the photoresist, removing those regions that have been photolyzed (e.g., by using an appropriate developer), depositing a layer of titanium about 500 nm thick using RF magnetron sputtering over the entire surface and removing predetermined regions of the deposited titanium (e.g. by dissolving the underlying photoresist), intricate patterns of individually addressable electrodes were fabricated on the substrate.

Figure 4:
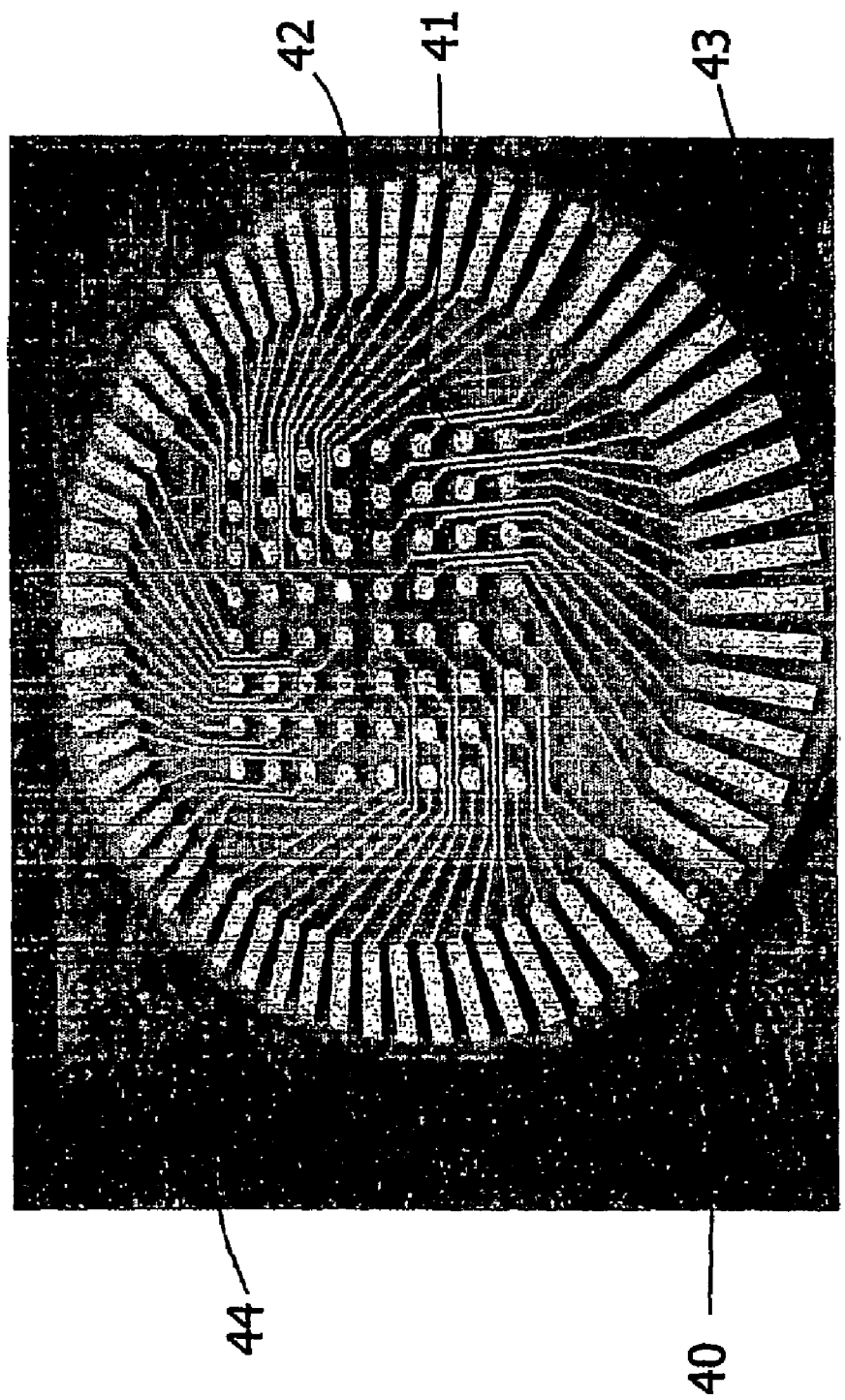
FIG. 4 is a photograph of an electrode array comprising thin film catalyst compositions deposited on individually addressable electrodes, in accordance with the present invention.

Referring to FIG. 4, the fabricated array 40 consisted of 64 individually addressable electrodes 41 (about 1.7 mm in diameter) arranged in an 8×8 square that were isolated from each other (by adequate spacing) and from the substrate 44 (fabricated on an insulating substrate), and whose interconnects 42 and contact pads 43 were insulated from the electrochemical testing solution (by the hardened photoresist or other suitable insulating material).

After the initial array fabrication and prior to depositing the catalysts for screening, a patterned insulating layer covering the wires and an inner portion of the peripheral contact pads, but leaving the electrodes and the outer portion of the peripheral contact pads exposed (preferably approximately half of the contact pad is covered with this insulating layer) was deposited. Because of the insulating layer, it is possible to connect a lead (e.g., a pogo pin or an alligator clip) to the outer portion of a given contact pad and address its associated electrode while the array is immersed in solution, without having to worry about reactions that can occur on the wires or peripheral contact pads. The insulating layer was a hardened photoresist, but any other suitable material known to be insulating in nature could have been used (e.g., glass, silica, alumina, magnesium oxide, silicon nitride, boron nitride, yttrium oxide, or titanium dioxide).

Following the creation of the titanium electrode array, a steel mask having 64 holes (1.7 mm in diameter) was pressed onto the substrate to prevent deposition of sputtered material onto the insulating resist layer. The deposition of the catalysts was also accomplished using RF magnetron sputtering and a two shutter masking system as described by Wu et al. which enable the deposition of material onto 1 or more electrodes at a time. Each individual thin film catalyst was created by a super lattice deposition method. For example, when preparing a catalyst composition comprising metals M1, M2 and M3, each is deposited, and then partially or fully alloyed, onto one electrode. More specifically, first a metal M1 sputter target is selected and a thin film of M1 having a defined thickness is deposited on the electrode. This initial thickness is typically from about 3 to about 12 Å. After this, metal M2 is selected as the sputter target and a layer of M2 is deposited onto the layer of M1. The thickness of M2 layer is also from about 3 to about 12 Å. The thicknesses of the deposited layers are in the range of the diffusion length of the metal atoms (e.g., about 10 to about 30 Å) which allows in-situ alloying of the metals. Then, a layer of M3 is deposited onto the M1-M2 alloy forming a M1-M2-M3 alloy film. As a result of the three deposition steps, an alloy thin film (9-25 Å thickness) of the desired stoichiometry is created. This concludes one deposition cycle. In order to achieve the desired total thickness of a cathode catalyst material, deposition cycles are repeated as necessary which results in the creation of a super lattice structure of a defined total thickness (typically about 700 Å). Although the number, thickness (stoichiometry) and order of application of the individual metal layers may be determined manually, it is desirable to utilize a computer program to design an output file which contains the information necessary to control the operation of the sputtering device during the preparation of a particular library wafer (i.e., array). One such computer program is the LIBRARY STUDIO software available from Symyx Technologies, Inc. of Santa Clara, Calif. and described in European Patent No. 1080435 B1. The compositions of several as-sputtered alloys were analyzed using Electron Dispersive Spectroscopy (EDS) to confirm that they were consistent with desired compositions (chemical compositions determined using EDS are within about 5% of the actual composition).

Arrays were prepared to evaluate the specific alloy compositions set forth in Tables A-D below. On each array one electrode consisted essentially of platinum and served as an internal standard for the screening operation.

TABLE A

| Electrode Number | End Current Density (Absolute Activity) mA/cm$^2$ | End Current Density per Weight Fraction of Pt | Relative Activity Compared to Internal Pt | Pt atomic % | Cr atomic % | Cu atomic % | Ni atomic % |
|---|---|---|---|---|---|---|---|
| 28 | −3.32 | −7.20 | 4.36 | 20 | 20 | 0 | 60 |
| 5 | −3.08 | −6.91 | 4.05 | 20 | 20 | 60 | 0 |
| 45 | −2.37 | −4.90 | 3.12 | 22 | 22 | 44 | 11 |
| 27 | −2.14 | −4.40 | 2.82 | 22 | 22 | 33 | 22 |
| 30 | −0.90 | −1.29 | 1.18 | 40 | 20 | 0 | 40 |
| 37 | −0.71 | −1.04 | 0.94 | 40 | 20 | 40 | 0 |
| 56 | −0.76 | −0.76 | 1.00 | 100 | 0 | 0 | 0 |

TABLE B

| Electrode Number | End Current Density (Absolute Activity) mA/cm² | End Current Density per Weight Fraction of Pt | Relative Activity Compared to Internal Pt | Pt atomic % | Cr atomic % | Cu atomic % |
|---|---|---|---|---|---|---|
| 25 | −4.05 | −7.62 | 4.69 | 26 | 15 | 59 |
| 17 | −4.11 | −7.59 | 4.76 | 27 | 9 | 64 |
| 33 | −3.87 | −7.45 | 4.49 | 25 | 22 | 53 |
| 26 | −2.88 | −5.00 | 3.34 | 30 | 17 | 53 |
| 18 | −2.83 | −4.88 | 3.29 | 30 | 10 | 59 |
| 34 | −2.60 | −4.57 | 3.02 | 29 | 26 | 46 |
| 41 | −2.18 | −4.35 | 2.53 | 23 | 32 | 45 |
| 9 | −2.38 | −4.35 | 2.77 | 28 | 4 | 68 |
| 10 | −1.90 | −3.25 | 2.20 | 31 | 5 | 64 |
| 35 | −1.37 | −2.17 | 1.59 | 34 | 30 | 36 |
| 19 | −1.30 | −2.08 | 1.51 | 35 | 11 | 54 |
| 27 | −1.23 | −1.96 | 1.43 | 34 | 20 | 46 |
| 11 | −1.21 | −1.94 | 1.40 | 35 | 5 | 60 |
| 20 | −1.06 | −1.55 | 1.23 | 40 | 13 | 47 |
| 12 | −1.02 | −1.52 | 1.19 | 40 | 6 | 55 |
| 28 | −0.88 | −1.26 | 1.02 | 40 | 23 | 36 |
| 13 | −0.92 | −1.26 | 1.07 | 46 | 7 | 47 |
| 21 | −0.94 | −1.26 | 1.09 | 47 | 16 | 37 |
| 14 | −0.90 | −1.13 | 1.04 | 54 | 8 | 38 |
| 8 | −0.86 | −0.86 | 1.00 | 100 | 0 | 0 |

TABLE C

| Electrode Number | End Current Density (Absolute Activity) mA/cm² | End Current Density per Weight Fraction of Pt | Relative Activity Compared to Internal Pt | Pt atomic % | Cr atomic % | Ni atomic % |
|---|---|---|---|---|---|---|
| 25 | −4.057 | −8.869 | 7.388 | 20 | 10 | 70 |
| 33 | −2.086 | −4.524 | 3.798 | 20 | 20 | 60 |
| 7 | −1.548 | −3.358 | 2.819 | 20 | 20 | 60 |
| 39 | −1.503 | −3.285 | 2.736 | 20 | 10 | 70 |
| 17 | −1.164 | −1.969 | 2.120 | 30 | 10 | 60 |
| 63 | −1.088 | −1.826 | 1.981 | 30 | 20 | 50 |
| 15 | −0.906 | −1.950 | 1.650 | 20 | 30 | 50 |
| 1 | −0.858 | −1.846 | 1.562 | 20 | 30 | 50 |
| 57 | −0.748 | −1.248 | 1.363 | 30 | 30 | 40 |
| 36 | −0.695 | −1.003 | 1.266 | 40 | 10 | 50 |
| 49 | −0.678 | −0.978 | 1.234 | 40 | 10 | 50 |
| 41 | −0.589 | −0.763 | 1.073 | 50 | 10 | 40 |
| 62 | −0.588 | −0.696 | 1.072 | 60 | 30 | 10 |
| 19 | −0.582 | −0.825 | 1.060 | 40 | 40 | 20 |
| 34 | −0.582 | −0.753 | 1.060 | 50 | 10 | 40 |
| 12 | −0.558 | −0.795 | 1.016 | 40 | 30 | 30 |
| 27 | −0.554 | −0.917 | 1.009 | 30 | 40 | 30 |
| 48 | −0.549 | −0.549 | 1.000 | 100 | 0 | 0 |
| 54 | −0.546 | −0.613 | 0.994 | 70 | 10 | 20 |
| 38 | −0.544 | −0.700 | 0.991 | 50 | 20 | 30 |
| 10 | −0.544 | −0.696 | 0.990 | 50 | 30 | 20 |
| 60 | −0.543 | −0.699 | 0.988 | 50 | 20 | 30 |
| 53 | −0.540 | −0.760 | 0.983 | 40 | 50 | 10 |
| 30 | −0.539 | −0.697 | 0.981 | 50 | 10 | 40 |
| 2 | −0.531 | −0.683 | 0.966 | 50 | 20 | 30 |
| 46 | −0.524 | −0.561 | 0.954 | 80 | 10 | 10 |
| 4 | −0.524 | −0.752 | 0.954 | 40 | 20 | 40 |
| 40 | −0.519 | −0.584 | 0.945 | 70 | 10 | 20 |
| 21 | −0.511 | −0.840 | 0.930 | 30 | 50 | 20 |
| 22 | −0.510 | −0.610 | 0.929 | 60 | 10 | 30 |
| 8 | −0.507 | −0.567 | 0.923 | 70 | 20 | 10 |
| 6 | −0.502 | −0.643 | 0.914 | 50 | 30 | 20 |
| 29 | −0.502 | −1.062 | 0.914 | 20 | 50 | 30 |
| 51 | −0.489 | −0.622 | 0.890 | 50 | 40 | 10 |
| 35 | −0.484 | −0.796 | 0.882 | 30 | 50 | 20 |
| 58 | −0.448 | −0.532 | 0.815 | 60 | 20 | 20 |
| 3 | −0.439 | −0.718 | 0.800 | 30 | 60 | 10 |
| 14 | −0.436 | −0.555 | 0.794 | 50 | 40 | 10 |
| 5 | −0.320 | −0.668 | 0.584 | 20 | 70 | 10 |

TABLE C-continued

| Electrode Number | End Current Density (Absolute Activity) mA/cm$^2$ | End Current Density per Weight Fraction of Pt | Relative Activity Compared to Internal Pt | Pt atomic % | Cr atomic % | Ni atomic % |
| --- | --- | --- | --- | --- | --- | --- |
| 9 | −0.207 | −0.443 | 0.378 | 20 | 40 | 40 |
| 37 | −0.085 | −0.179 | 0.155 | 20 | 60 | 20 |

TABLE D

| Electrode Number | End Current Density (Absolute Activity) mA/cm$^2$ | End Current Density per Weight Fraction of Pt | Relative Activity Compared to Internal Pt | Pt atomic % | Cr atomic % | Cu atomic % |
| --- | --- | --- | --- | --- | --- | --- |
| 33 | −4.837 | −10.852 | 8.421 | 20 | 20 | 60 |
| 25 | −4.147 | −9.427 | 7.220 | 20 | 10 | 70 |
| 39 | −4.024 | −9.149 | 7.007 | 20 | 10 | 70 |
| 17 | −2.792 | −4.858 | 4.861 | 30 | 10 | 60 |
| 7 | −1.690 | −3.792 | 2.943 | 20 | 20 | 60 |
| 63 | −1.541 | −2.651 | 2.683 | 30 | 20 | 50 |
| 57 | −0.911 | −1.550 | 1.586 | 30 | 30 | 40 |
| 15 | −0.831 | −1.840 | 1.447 | 20 | 30 | 50 |
| 34 | −0.647 | −0.850 | 1.127 | 50 | 10 | 40 |
| 27 | −0.645 | −1.085 | 1.123 | 30 | 40 | 30 |
| 30 | −0.628 | −0.825 | 1.094 | 50 | 10 | 40 |
| 49 | −0.627 | −0.924 | 1.091 | 40 | 10 | 50 |
| 38 | −0.611 | −0.796 | 1.064 | 50 | 20 | 30 |
| 54 | −0.609 | −0.689 | 1.061 | 70 | 10 | 20 |
| 41 | −0.591 | −0.776 | 1.029 | 50 | 10 | 40 |
| 22 | −0.590 | −0.713 | 1.028 | 60 | 10 | 30 |
| 60 | −0.579 | −0.754 | 1.009 | 50 | 20 | 30 |
| 40 | −0.579 | −0.655 | 1.008 | 70 | 10 | 20 |
| 48 | −0.574 | −0.574 | 1.000 | 100 | 0 | 0 |
| 51 | −0.574 | −0.734 | 1.000 | 50 | 40 | 10 |
| 36 | −0.561 | −0.827 | 0.976 | 40 | 10 | 50 |
| 9 | −0.554 | −1.211 | 0.965 | 20 | 40 | 40 |
| 58 | −0.554 | −0.663 | 0.964 | 60 | 20 | 20 |
| 2 | −0.543 | −0.707 | 0.945 | 50 | 20 | 30 |
| 10 | −0.516 | −0.666 | 0.899 | 50 | 30 | 20 |
| 6 | −0.498 | −0.643 | 0.868 | 50 | 30 | 20 |
| 62 | −0.487 | −0.578 | 0.848 | 60 | 30 | 10 |
| 8 | −0.462 | −0.519 | 0.805 | 70 | 20 | 10 |
| 46 | −0.459 | −0.493 | 0.799 | 80 | 10 | 10 |
| 14 | −0.453 | −0.579 | 0.788 | 50 | 40 | 10 |
| 1 | −0.448 | −0.991 | 0.780 | 20 | 30 | 50 |
| 35 | −0.420 | −0.698 | 0.732 | 30 | 50 | 20 |
| 53 | −0.413 | −0.585 | 0.719 | 40 | 50 | 10 |
| 4 | −0.385 | −0.562 | 0.671 | 40 | 20 | 40 |
| 21 | −0.336 | −0.557 | 0.584 | 30 | 50 | 20 |
| 37 | −0.316 | −0.672 | 0.550 | 20 | 60 | 20 |
| 3 | −0.286 | −0.470 | 0.499 | 30 | 60 | 10 |
| 5 | −0.275 | −0.576 | 0.478 | 20 | 70 | 10 |
| 19 | −0.270 | −0.386 | 0.470 | 40 | 40 | 20 |
| 12 | −0.225 | −0.326 | 0.392 | 40 | 30 | 30 |
| 29 | −0.101 | −0.217 | 0.175 | 20 | 50 | 30 |

Example 2

Screening Catalysts for Electrocatalytic Activity

The catalysts compositions set forth in Tables A and B that were synthesized on arrays according to the method set forth in Example 1 were screened for electrochemical reduction of molecular oxygen to water according to Protocol 1 (detailed below) to determine relative electrocatalytic activity against an internal and/or external platinum standard. Additionally, the catalyst compositions set forth in Tables C and D that were synthesized on arrays according to the method set forth in Example 1 were screen for electrochemical reduction of molecular oxygen to water according to Protocol 2 (detailed below) to determine relative electrocatalytic activity against an internal and/or external platinum standard.

In general, the array wafers were assembled into an electrochemical screening cell and a screening device established an electrical contact between the 64 electrode catalysts (working electrodes) and a 64-channel multi-channel potentiostat used for the screening. Specifically, each wafer array was placed into a screening device such that all 64 spots are facing upward and a tube cell body that was generally annular and having an inner diameter of about 2 inches (5 cm) was pressed onto the upward facing wafer surface. The diameter of this tubular cell was such that the portion of the wafer with the square electrode array formed the base of a cylindrical volume while the contact pads were outside the cylindrical volume. A liquid ionic solution (i.e., 0.5 M $H_2SO_4$ aqueous electrolyte) was poured into this cylindrical volume, and a common counter electrode (i.e., platinum gauze) and a common reference electrode (e.g., mercury/mercury sulfate reference electrode (MMS)) were placed into the electrolyte solution to close the electrical circuit.

A rotator shaft with blades was placed into the electrolyte to provide forced convection-diffusion conditions during the screening. The rotation rate was typically between about 300 to about 400 rpm. Depending on the screening experiment, either argon or pure oxygen was bubbled through the electrolyte during the measurements. Argon served to remove $O_2$ gas in the electrolyte to simulate $O_2$-free conditions used for the initial conditioning of the catalysts. The introduction of pure oxygen served to saturate the electrolyte with oxygen for the oxygen reduction reaction. During the screening, the electrolyte was maintained at 60° C. and the rotation rate was constant.

Protocol 1: Three groups of tests were performed to screen the activity of the catalysts. The electrolyte was purged with argon for about 20 minutes prior to the electrochemical measurements. The first group of tests comprised cyclic voltammetric measurements while purging the electrolyte with argon. Specifically, the first group of tests comprised:
  a. a potential sweep applied only to the internal platinum standard from open circuit potential (OCP) to about +0.3 V to about −0.63 V and back to about +0.3 V at a rate of about 20 mV/s;
  b. 70 consecutive potential sweeps from OCP to about +0.3 V to about −0.7 V and back to about +0.3 V at a rate of about 200 mV/s; and
  c. a potential sweep from OCP to about +0.3 V to about −0.63 V and back to about +0.3 V at a rate of about 20 mV/s.

If the cyclic voltammetric response in step (a) was similar to that of a clean platinum surface (as indicated by hydrogen adsorption and desorption regions), then step (b) was skipped and test (c) was performed. If, however, the step a response did not indicate a clean platinum surface, then the potential cycling of all 64 channels was performed according to step (b). After step (b), step (a) was repeated. Thus, steps (a) and (b) were performed until a clean platinum surface was indicated and then step (c) was performed. After step (c) of the first group of tests, the electrolyte was purged with oxygen for approximately 30 minutes. Then, the following second group of tests were performed while continuing to purge with oxygen:
  a. measuring the open circuit potential (OCP) for a minute; then, the voltage was stepped to about −0.4 V and the voltage was maintained for 20 seconds, after which the voltage was swept up to about +0.3 V at a rate of about 10 mV/s; and
  b. measuring the OCP for a minute; then applying a potential step from OCP to about +0.1 V while measuring the current for about 5 minutes.

The third group of tests comprised a repeat of the second group of tests after about one hour from completion of the second group of tests. The electrolyte was continually stirred and purged with oxygen during the waiting period. All the foregoing test voltages are with reference to a mercury/mercury sulfate (MMS) electrode. Additionally, an external platinum standard comprising an array of 64 platinum electrodes was used to monitor the tests to ensure the accuracy and consistency of the oxygen reduction evaluation.

Protocol 2: Four groups of tests were performed to screen the activity of the catalysts. The first group is a pretreatment process, whereas the other three groups are identical sets of experiments in order to screen the oxygen reduction activity as well as the current electrochemical surface area of the catalysts. The electrolyte was purged with argon for about 20 minutes prior to the electrochemical measurements. The first group of tests comprised cyclic voltammetric measurements while purging the electrolyte with argon. Specifically, the first group of tests comprised:
  a. a potential sweep from open circuit potential (OCP) to about +0.3 V to about −0.63 V and back to about +0.3 V at a rate of about 20 mV/s;
  b. fifty consecutive potential sweeps from OCP to about +0.3 V to about −0.7 V and back to about +0.3 V at a rate of about 200 mV/s; and
  c. a potential sweep from OCP to about +0.3 V to about −0.63 V and back to about +0.3 V at a rate of about 20 mV/s.

After step (c) of the first group of tests, the electrolyte was purged with oxygen for approximately 30 minutes. Then, the following second group of tests were performed, which comprised a test in an oxygen-saturated solution (i.e., test (a)), followed by a test performed in an Ar-purged (i.e., an oxygen-free solution, test (b)):
  a. in an oxygen-saturated solution, the OCP was measured for a minute; a potential step was then applied from OCP to about −0.4 V; this potential was held for approximately 30 seconds, and then the potential was stepped to about +0.1 V while measuring the current for about 5 minutes; and
  b. after purging the electrolyte with Ar for approximately 30 minutes, a potential sweep was performed from open circuit potential (OCP) to about +0.3 V to about −0.63 V and back to about +0.3 V, at a rate of about 20 mV/s.

The third and fourth group of tests comprised a repeat of the second group of tests after completion. All the foregoing test voltages are with reference to a mercury/mercury sulfate (MMS) electrode. Additionally, an external platinum standard comprising an array of 64 platinum electrodes was used to monitor the tests to ensure the accuracy and consistency of the oxygen reduction evaluation.

The specific catalysts compositions set forth in Tables A and B, as well as C and D, were prepared and screened in accordance with the above-described methods of Protocols 1 and 2, respectively, and the test results are set forth therein. The screening results in Tables A and B are for the third test group (steady state currents at +0.1 V MMS). The screening results in Tables C and D were taken from the oxygen reduction measurements of the fourth group of tests (i.e., the last screening in an oxygen-saturated solution), the Ar-saturated steps serving as an evaluation of additional catalyst related parameters such as surface area over time.

The current value reported (End Current Density) is the result of averaging the last three current values of the chronoamperometric test normalized for geometric surface area. Referring to Table A, it is to be noted that, for example, compositions corresponding to Electrode Numbers 28, 5, 45, 27 and 30 exhibited an oxygen reduction activity greater than the internal platinum standard. Referring to Table B, it is to be further noted that, for example, the compositions corresponding to Electrode Numbers 25, 17, 33, 26, 18, 34, 41, 9, 10, 35, 19, 27, 11, 20, 12, 28, 13, 21, and 14 exhibited an oxygen reduction activity greater than the internal platinum standard. Referring to Table C, it is to be still further noted that, for example, the compositions corresponding to Electrode Numbers 25, 33, 7, 39, 17, 63, 15, 1, 57, 36, 49, 41, 62, 19, 34, 12 and 27 exhibited an oxygen reduction activity greater than the internal platinum standard. Referring to Table D, it is to be still further noted that, for example, the compositions corresponding to Electrode Numbers 33, 25, 39, 17, 7, 63, 57, 15, 34, 27, 30, 49, 38, 54, 41, 22, 60, and 40 exhibited an oxygen reduction activity greater than the internal platinum standard.

Example 3

Synthesis of Supported Catalysts

The synthesis of multiple catalysts on carbon support particles, as indicated from the results in Table E, was attempted according to different process conditions in order to evaluate the performance of the catalyst alloys while in a state that is typically used in fuel cell. Among the catalysts synthesized were $Pt_{20}Cr_{20}Cu_{60}$, $Pt_{20}Cr_{20}Ni_{60}$, $Pt_{22}Cr_{22}Cu_{44}Ni_{12}$, and $Pt_{28}Cr_5Cu_{67}$ alloys (see, Table E, Target Catalyst Comp., infra). To synthesize these supported catalysts, the component precursors were deposited or precipitated on supported platinum powder (i.e., platinum nanoparticles supported on carbon black particles). Platinum supported on carbon black is commercially available from companies such as Johnson Matthey, Inc., of New Jersey and E-Tek Div. of De-Nora, N.A., Inc., of Somerset, N.J. Such supported platinum powder is available with a wide range of platinum loading. The supported platinum powder used in this example had a nominal platinum loading of about 20 or about 40 percent by weight, a platinum surface area of between about 150 and about 170 $m^2/g$ (determined by CO adsorption), a combined carbon and platinum surface area between about 350 and about 400 $m^2/g$ (determined by $N_2$ adsorption), and an average particle size of less than about 0.5 mm (determined by sizing screen).

Referring to Table E, the catalysts corresponding to the target compositions of $Pt_{20}Cr_{20}Cu_{60}$, $Pt_{20}Cr_{20}Ni_{60}$ and $Pt_{22}Cr_{22}Cu_{44}Ni_{12}$ (HFC 111, 112, 113, 114, 117 and 118) were formed on carbon support particles using a chemical precipitation method according to the following steps. First, about 0.25 g of carbon supported platinum powder was dispersed in about 200 ml of room temperature 18 MΩ deionized water using an ultrasonic blending device (e.g., an AQUASONIC 50 D set at power level 9) for about 2 hours to form a slurry. The slurry was stirred using a magnetic stirring device, and while being stirred, appropriate volumes based on the targeted catalyst composition of one or more appropriate solutions comprising the metals to be alloyed (e.g., fully or partially) with the platinum nanoparticles were added dropwise to the slurry (e.g., a 1 M copper (II) nitrate trihydrate aqueous solution, a 1 M nickel (II) nitrate hydrate aqueous solution, and a 1 M chromium (III) nitrate nonahydrate aqueous solution). Specifically, for example, to produce HFC 111 and 112, 0.74 ml of the 1 M copper (II) nitrate trihydrate aqueous solution and 0.25 ml of the 1 M chromium (III) nitrate nonahydrate aqueous solution were added. The stirring was continued and the slurry containing the dissolved metal salts was heated to a temperature between about 60 and about 90° C. for about 1 hour. Precipitation of compounds comprising the metals was then initiated by slowly adding a 10 wt % ammonium hydroxide aqueous solution to the slurry until the slurry had a pH of about 10. The slurry was stirred for about 15 more minutes. The slurry was then filtered from the liquid under vacuum after which the filtrate was washed with about 150 ml of deionized water. The powder was then dried at a temperature of about 90° C. for about 4 hours.

Referring to Table E, the catalysts corresponding to the target compositions $Pt_{20}Cr_{20}Cu_{60}$ and $Pt_{28}Cr_5Cu_{67}$ (HFC 130, 131, 289, and 292) were formed on carbon support particles using a freeze-drying precipitation method. The freeze-drying method comprised forming a precursor solution comprising the desired metal atoms in the desired concentrations. For example, to prepare the target $Pt_{20}Cu_{60}Cr_{20}$ catalyst composition (HFC 130), about 0.143 g of $Cu(NO_3)_2.3H_2O$ and about 0.079 g of $Cr(NO_3)_3.9H_2O$ were dissolved in 5 ml $H_2O$. The source solution was introduced into an HDPE vial containing 0.200 g of supported platinum powder which had a nominal platinum loading of about 19.2 percent by weight resulting in a black suspension. The suspension was homogenized by immersing a probe of a BRANSON SONIFIER 150 into the vial and sonicating the mixture for about 2 minutes at a power level of 3. The vial containing the homogenized suspensions was then immersed in a liquid nitrogen bath for about 3 minutes to solidify the suspensions. The solid suspension was then freeze-dried for about 24 hours using a LABONCO FREEZE DRY SYSTEM (Model 79480) to remove the solvent. The tray and the collection coil of the freeze dryer were maintained at about 27° C. and about −48° C., respectively, while evacuating the system (the pressure was maintained at about 0.15 mbar). After freeze-drying, the vial contained a powder comprising the supported platinum powder, and the copper and chromium precursors deposited thereon.

The recovered precursor powders (chemically precipitated and freeze-dried) were then subjected to a heat treatment to reduce the precursors to their metallic state, and to fully or partially alloy the metals with each other and the platinum on the carbon black particles. One particular heat treatment comprised heating the powder in a quartz flow furnace with an atmosphere comprising about 6% $H_2$ and 94% Ar using a temperature profile of room temperature to about 40° C. at a rate of about 5° C./min; holding at about 40° C. for 2 hours; increasing the temperature to about 200° C. at a rate of 5° C./min; holding at about 200° C. for two hours; increasing the temperature at a rate of about 5° C./min to about 600, 700, 800, 900 or 950° C.; holding at a maximum temperature of about 600, 700, 800, 900 or 950° C. for a duration of between about 1.2 to about 10 or 12 hours, or about 2 to about 7 hours (as indicated in Table E); and cooling down to room temperature.

In order to determine the actual composition of the supported catalysts, the differently prepared catalysts (e.g., by composition variation or by heat treatment variation) were subjected to ICP elemental analysis or subjected to EDS (Electron Dispersive Spectroscopy) elemental analysis. For the latter technique, the sample powders were compressed into 6 mm diameter pellets with a thickness of about 1 mm. The target composition and actual composition for the prepared supported catalysts are set forth in Table E.

TABLE E

| Powder Name | Target Catalyst Comp. | Max Alloying Temp for a duration (° C./hrs) | Actual Catalyst Comp. | Target Pt loading (wt %) | Meas. Pt loading (wt %) | Log Pt Mass Activity at +0.15 V MMS | Pt Mass Activity at +0.15 V MMS (mA/mg Pt) | Relative perf. at +0.15 V MMS | Catalyst Mass Activity at +0.15 V MMS (mA/mg) | Catalyst Comp. after RDE experiment |
|---|---|---|---|---|---|---|---|---|---|---|
| HFC10 | Pt | | Pt | 37.8 | 37.8 | 2.11 | 128.82 | 1.00 | 48.70 | |
| HFC111 | Pt20 Cu60 Cr20 | 700/7 | | 15 | | | | | 45.30 | |
| HFC112 | Pt20 Cu60 Cr20 | 900/2 | | 15 | | | | | 49.67 | |
| HFC113 | Pt20 Ni60 Cr20 | 700/7 | | 15 | | | | | 37.68 | |
| HFC114 | Pt20 Ni60 Cr20 | 900/2 | | 15 | | | | | 30.63 | |
| HFC117 | Pt22 Ni12 Cu44 Cr22 | 700/7 | | 16 | | | | | 38.58 | |
| HFC118 | Pt22 Ni12 Cu44 Cr22 | 900/2 | | 16 | | | | | 39.92 | |
| HFC130 | Pt20 Cu60 Cr20 | 700/7 | Pt28 Cu55 Cr17 | 15.4 | 16 | 2.62 | 420.15 | 3.26 | 67.22 | |
| HFC131 | Pt20 Cu60 Cr20 | 900/2 | | 15 | | | | | 21.68 | |
| HFC289 | Pt28 Cu67 Cr5 | 700/7 | Pt32 Cu63 Cr5 | 16.6 | 15.4 | 2.65 | 442.38 | 3.43 | 68.13 | |
| HFC292 | Pt28 Cu67 Cr5 | 900/2 | | 16.6 | | | | | 48.21 | |
| HFC307 | Pt20 Cu60 Cr20 | 700/7 | | 14 | | | | | 55.63 | |
| HFC308 | Pt20 Cu60 Cr20 | 600/2 | | 14 | | | | | 52.75 | |
| HFC310 | Pt21 Cu35 Cr44 | 700/7 | | 15.8 | | | | | 55.36 | |
| HFC311 | Pt27 Cu35 Cr37 | 700/7 | | 16.7 | | | | | 63.05 | |
| HFC312 | Pt34 Cu36 Cr30 | 700/7 | | 17.3 | | | | | 53.26 | |
| HFC313 | Pt34 Cu46 Cr20 | 700/7 | | 17.2 | | | | | 51.15 | |
| HFC315 | Pt21 Cu35 Cr44 | 600/12 | | 15.8 | | | | | 68.45 | |
| HFC316 | Pt27 Cu35 Cr37 | 600/12 | | 16.7 | | | | | 61.11 | |
| HFC317 | Pt34 Cu36 Cr30 | 600/12 | | 17.3 | | | | | 52.67 | |
| HFC318 | Pt34 Cu46 Cr20 | 600/12 | | 17.2 | | | | | 49.04 | |
| HFC467 | Pt20 Ni70 Cr10 | 700/7 | | 15.6 | | | | | 41.16 | |
| HFC468 | Pt20 Ni60 Cr 20 | 700/7 | | 15.7 | | | | | 34.52 | |
| HFC469 | Pt30 Ni60 Cr10 | 700/7 | | 16.9 | | | | | 50.91 | |
| HFC472 | Pt20 Ni70 Cr10 | 900/2 | | 15.6 | | | | | 30.34 | |
| HFC473 | Pt20 Ni60 Cr20 | 900/2 | | 15.7 | | | | | 20.82 | |
| HFC474 | Pt30 Ni60 Cr10 | 900/2 | | 16.9 | | | | | 31.63 | |
| HFC480 | Pt20 Cu60 Cr20 | 600/7 | Pt24 Cu56 Cr20 | 15.5 | 12.7 | 2.75 | 557.90 | 4.33 | 70.85 | |
| HFC481 | Pt30 Cu50 Cr20 | 600/7 | | 16.9 | | | | | 44.81 | |
| HFC482 | Pt30 Cu60 Cr10 | 600/7 | | 16.8 | | | | | 68.43 | |
| HFC486 | Pt20 Cu60 Cr20 | 900/1.2 | | 15.5 | | | | | 59.79 | |
| HFC487 | Pt30 Cu50 Cr20 | 900/1.2 | | 16.9 | | | | | 44.39 | |
| HFC488 | Pt30 Cu60 Cr10 | 900/1.2 | | 16.8 | | | | | 66.49 | |
| HFC650 | Pt20 Cu60 Cr20 | 900/10 | Pt24 Cu56 Cr20 | 15.5 | 17.9 | 2.64 | 432.82 | 3.36 | 77.48 | Pt44 Cu20 Cr36 |
| HFC737 | Pt20 Cu60 Cr20 | 950/10 | | 15.37 | | | | | 61.19 | Pt39 Cu26 Cr35 |
| HFC741 | Pt20 Cu60 Cr20 | 950/2 | | 15.37 | | | | | 49.74 | Pt41 Cu24 Cr36 |
| HFC745 | Pt20 Cu60 Cr20 | 900/10 | | 15.37 | | | | | 61.19 | Pt43 Cu21 Cr36 |
| HFC749 | Pt20 Cu60 Cr20 | 900/2 | | 15.37 | | | | | 53.29 | Pt46 Cu19 Cr36 |
| HFC753 | Pt20 Cu60 Cr20 | 800/10 | | 15.65 | | | | | 66.76 | Pt40 Cu28 Cr32 |
| HFC757 | Pt20 Cu60 Cr20 | 800/2 | | 15.65 | | | | | 66.76 | Pt40 Cu26 Cr34 |
| HFC761 | Pt20 Cu60 Cr20 | 700/10 | | 15.65 | | | | | 63.76 | Pt49 Cu17 Cr35 |
| HFC765 | Pt20 Cu60 Cr20 | 700/2 | | 15.65 | | | | | 80.26 | Pt49 Cu19 Cr36 |
| HFC769 | Pt20 Cu60 Cr20 | 600/10 | | 15.65 | | | | | 86.00 | Pt41 Cu24 Cr35 |
| HFC773 | Pt20 Cu60 Cr20 | 600/2 | | 15.65 | | | | | 71.53 | Pt45 Cu17 Cr39 |
| HFC775 | Pt35 Cu55 Cr10 | 950/10 | | 17.25 | | | | | 59.91 | |
| HFC776 | Pt30 Cu65 Cr5 | 950/10 | | 16.78 | | | | | 63.04 | Pt49 Cu45 Cr6 |
| HFC777 | Pt10 Cu75 Cr15 | 950/10 | | 12.42 | | | | | 47.75 | Pt33 Cu27 Cr40 |
| HFC778 | Pt25 Cu70 Cr5 | 950/10 | Pt28 Cu67 Cr5 | 16.20 | | | | | 75.01 | Pt48 Cu45 Cr7 |
| HFC779 | Pt35 Cu45 Cr20 | 950/10 | | 17.30 | | | | | 44.27 | Pt53 Cu20 27 |
| HFC780 | Pt35 Cu60 Cr5 | 950/10 | | 17.23 | | | | | 51.28 | |
| HFC781 | Pt20 Cu75 Cr5 | 950/10 | | 15.39 | | | | | 60.57 | Pt47 Cu43 Cr10 |
| HFC782 | Pt30 Cu40 Cr30 | 950/10 | Pt34 Cu34 Cr32 | 16.92 | | | | | 39.49 | Pt45 Cu16 Cr38 |
| HFC784 | Pt10 Cu80 Cr10 | 950/10 | | 12.37 | | | | | 52.42 | Pt52 Cu40 Cr8 |
| HFC785 | Pt25 Cu40 Cr35 | 950/10 | | 16.39 | | | | | 51.90 | |
| HFC786 | Pt15 Cu45 Cr40 | 950/10 | | 14.50 | | | | | 53.12 | Pt40 Cu27 Cr33 |
| HFC787 | Pt15 Cu75 Cr10 | 950/10 | | 14.26 | | | | | 46.90 | |
| HFC788 | Pt20 Cu45 Cr35 | 950/10 | | 15.61 | | | | | 42.30 | |
| HFC789 | Pt40 Cu55 Cr5 | 950/10 | | 17.58 | | | | | 52.11 | |
| HFC791 | Pt10 Cu50 Cr40 | 950/10 | | 12.65 | | | | | 55.36 | Pt53 Cu36 Cr11 |
| HFC792 | Pt40 Cu50 Cr10 | 950/10 | | 17.60 | | | | | 58.95 | Pt57 Cu30 Cr14 |
| HFC794 | Pt15 Cu80 Cr5 | 950/10 | | 14.22 | | | | | 71.16 | Pt47 Cu40 Cr14 |
| HFC795 | Pt35 Cu40 Cr25 | 950/10 | | 17.33 | | | | | 46.82 | |
| HFC796 | Pt40 Cu45 Cr15 | 950/10 | | 17.62 | | | | | 60.01 | Pt53 Cu30 Cr17 |
| HFC797 | Pt20 Cu40 Cr40 | 950/10 | | 15.64 | | | | | 52.10 | Pt31 Cu16 Cr53 |
| HFC798 | Pt40 Cu40 Cr20 | 950/10 | | 17.64 | | | | | 49.94 | Pt56 Cu20 Cr24 |

TABLE E-continued

| Powder Name | Target Catalyst Comp. | Max Alloying Temp for a duration (° C./hrs) | Actual Catalyst Comp. | Target Pt loading (wt %) | Meas. Pt loading (wt %) | Log Pt Mass Activity at +0.15 V MMS | Pt Mass Activity at +0.15 V MMS (mA/mg Pt) | Relative perf. at +0.15 V MMS | Catalyst Mass Activity at +0.15 V MMS (mA/mg) | Catalyst Comp. after RDE experiment |
|---|---|---|---|---|---|---|---|---|---|---|
| HFC799 | Pt20 Cu60 Cr20 | 950/10 | Pt21 Cu63 Cr15 | 15.50 | | | | | 58.49 | Pt43 Cu25 Cr32 |
| HFC800 | Pt20 Cu55 Cr25 | 950/10 | | 15.53 | | | | | 60.24 | Pt38 Cu25 Cr37 |
| HFC801 | Pt25 Cu55 Cr20 | 950/10 | | 16.29 | | | | | 54.77 | |
| HFC802 | Pt15 Cu60 Cr25 | 950/10 | | 14.38 | | | | | 48.34 | |
| HFC803 | Pt20 Cu65 Cr15 | 950/10 | | 15.46 | | | | | 60.31 | Pt46 Cu30 Cr24 |
| HFC804 | Pt25 Cu50 Cr25 | 950/10 | | 16.32 | | | | | 52.78 | |
| HFC805 | Pt15 Cu55 Cr30 | 950/10 | | 14.42 | | | | | 49.61 | |
| HFC806 | Pt30 Cu55 Cr15 | 950/10 | | 16.84 | | | | | 52.49 | |
| HFC809 | Pt30 Cu50 Cr20 | 950/10 | | 16.87 | | | | | 59.78 | Pt55 Cu21 Cr24 |
| HFC810 | Pt10 Cu60 Cr30 | 950/10 | | 12.56 | | | | | 31.95 | |
| HFC811 | Pt25 Cu60 Cr15 | 950/10 | | 16.26 | | | | | 52.63 | |
| HFC812 | Pt15 Cu65 Cr20 | 950/10 | | 14.34 | | | | | 49.43 | |
| HFC813 | Pt30 Cu60 Cr10 | 950/10 | | 16.81 | | | | | 56.35 | |
| HFC814 | Pt10 Cu70 Cr20 | 950/10 | | 12.47 | | | | | 37.40 | |
| HFC815 | Pt10 Cu65 Cr25 | 950/10 | | 12.51 | | | | | 29.02 | |
| HFC816 | Pt25 Cu65 Cr10 | 950/10 | | 16.23 | | | | | 57.41 | Pt49 Cu37 Cr14 |
| HFC817 | Pt10 Cu55 Cr35 | 950/10 | | 12.61 | | | | | 27.96 | |
| HFC818 | Pt35 Cu50 Cr15 | 950/10 | | 17.28 | | | | | 45.68 | |
| HFC819 | Pt20 Cu70 Cr10 | 950/10 | | 15.43 | | | | | 56.49 | Pt46 Cu37 Cr17 |
| HFC820 | Pt25 Cu45 Cr30 | 950/10 | | 16.35 | | | | | 48.58 | |
| HFC821 | Pt15 Cu50 Cr35 | 950/10 | | 14.46 | | | | | 43.63 | |
| HFC822 | Pt30 Cu45 Cr25 | 950/10 | | 16.89 | | | | | 44.54 | |
| HFC849 | Pt10 Cu35 Cr55 | 950/10 | | 12.80 | | | | | 31.56 | |
| HFC850 | Pt10 Cu30 Cr60 | 950/10 | | 12.85 | | | | | 22.81 | |
| HFC851 | Pt15 Cu40 Cr45 | 950/10 | | 14.54 | | | | | 37.85 | |
| HFC852 | Pt15 Cu35 Cr50 | 950/10 | | 14.58 | | | | | 34.91 | |
| HFC853 | Pt20 Cu30 Cr50 | 950/10 | | 15.72 | | | | | 29.08 | |
| HFC854 | Pt25 Cu35 Cr40 | 950/10 | | 16.42 | | | | | 37.42 | |
| HFC855 | Pt25 Cu30 Cr45 | 950/10 | | 16.45 | | | | | 42.37 | |
| HFC856 | Pt30 Cu35 Cr35 | 950/10 | | 16.95 | | | | | 49.62 | |
| HFC857 | Pt35 Cu30 Cr35 | 950/10 | | 17.38 | | | | | 38.99 | |
| HFC858 | Pt40 Cu35 Cr25 | 950/10 | | 17.67 | | | | | 36.11 | |
| HFC859 | Pt40 Cu30 Cr30 | 950/10 | | 17.69 | | | | | 36.87 | |
| HFC860 | Pt45 Cu45 Cr10 | 950/10 | | 17.88 | | | | | 28.78 | |
| HFC861 | Pt45 Cu35 Cr20 | 950/10 | | 17.92 | | | | | 20.15 | |
| HFC862 | Pt45 Cu30 Cr25 | 950/10 | | 17.94 | | | | | 22.73 | |
| HFC863 | Pt50 Cu45 Cr5 | 950/10 | | 18.09 | | | | | 21.99 | |
| HFC864 | Pt50 Cu40 Cr10 | 950/10 | | 18.11 | | | | | 23.76 | |
| HFC865 | Pt15 Cu30 Cr55 | 950/10 | | 14.63 | | | | | 24.84 | |
| HFC866 | Pt20 Cu35 Cr45 | 950/10 | | 15.68 | | | | | 36.61 | |
| HFC867 | Pt30 Cu30 Cr40 | 950/10 | | 16.98 | | | | | 39.36 | |
| HFC868 | Pt35 Cu35 Cr30 | 950/10 | | 17.35 | | | | | 49.18 | Pt55 Cu14 Cr31 |
| HFC869 | Pt45 Cu50 Cr5 | 950/10 | | 17.86 | | | | | 39.15 | |
| HFC870 | Pt45 Cu40 Cr15 | 950/10 | | 17.90 | | | | | 40.08 | Pt63 Cu24 Cr13 |
| HFC871 | Pt50 Cu35 Cr15 | 950/10 | | 18.13 | | | | | 36.01 | |
| HFC872 | Pt50 Cu30 Cr20 | 950/10 | | 18.15 | | | | | 36.53 | |
| HFC896 | Pt5 Cu65 Cr30 | 950/10 | | 9.06 | | | | | 13.68 | |
| HFC897 | Pt5 Cu70 Cr25 | 950/10 | | 9.01 | | | | | 11.96 | |
| HFC898 | Pt5 Cu60 Cr35 | 950/10 | | 9.10 | | | | | 2.75 | |
| HFC899 | Pt5 Cu75 Cr20 | 950/10 | | 8.96 | | | | | 3.19 | |
| HFC900 | Pt5 Cu50 Cr45 | 950/10 | | 9.20 | | | | | 7.54 | |
| HFC901 | Pt5 Cu85 Cr10 | 950/10 | | 8.87 | | | | | 28.23 | |
| HFC902 | Pt5 Cu45 Cr50 | 950/10 | | 9.25 | | | | | 6.37 | |
| HFC903 | Pt5 Cu90 Cr5 | 950/10 | | 8.82 | | | | | 9.01 | |
| HFC904 | Pt5 Cu55 Cr40 | 950/10 | | 9.15 | | | | | 13.32 | |
| HFC905 | Pt5 Cu80 Cr15 | 950/10 | | 8.91 | | | | | 25.62 | |
| HFC906 | Pt5 Cu40 Cr55 | 950/10 | | 9.31 | | | | | 4.34 | |
| HFC907 | Pt5 Cu35 Cr60 | 950/10 | | 9.36 | | | | | 1.30 | |
| HFC908 | Pt5 Cu30 Cr65 | 950/10 | | 9.41 | | | | | 0.29 | |
| HFC909 | Pt10 Cu45 Cr45 | 950/10 | | 12.70 | | | | | 0.61 | |
| HFC910 | Pt10 Cu85 Cr5 | 950/10 | | 12.33 | | | | | 16.41 | |
| HFC911 | Pt10 Cu40 Cr50 | 950/10 | | 12.75 | | | | | 10.60 | |
| HFC1004 | Pt20 Cu40 Cr40 | 800/2 | | 15.64 | | | | | 50.44 | |
| HFC1005 | Pt25 Cu70 Cr5 | 800/2 | | 16.20 | | | | | 76.23 | |
| HFC1006 | Pt40 Cu45 Cr15 | 800/2 | | 17.62 | | | | | 54.99 | |
| HFC1007 | Pt40 Cu50 Cr10 | 800/2 | | 17.60 | | | | | 41.99 | |

Example 4

Evaluating the Catalytic Activity of Supported Catalysts

The supported catalysts set forth in Table E and formed according to Example 3 were subjected to electrochemical measurements to evaluate their activities. For the evaluation, the supported catalysts were applied to a rotating disk electrode (RDE) as is commonly used in the art (see, Rotating disk electrode measurements on the CO tolerance of a high-surface area Pt/Vulcan carbon fuel cell electrocatalyst, Schmidt et al., Journal of the Electrochemical Society (1999), 146(4), 1296-1304; and Characterization of high-surface-area electrocatalysts using a rotating disk electrode configuration, Schmidt et al., Journal of the Electrochemical Society (1998), 145(7), 2354-2358). Rotating disk electrodes are a relatively fast and simple screening tool for evaluating supported catalysts with respect to their intrinsic electrolytic activity for oxygen reduction (e.g., the cathodic reaction of a fuel cell).

The rotating disk electrode was prepared by depositing an aqueous-based ink that comprises the supported catalyst and a NAFION solution on a glassy carbon disk. The concentration of catalyst powder in the NAFION solution was about 1 mg/ml. The NAFION solution comprised the perfluorinated ion-exchange resin, lower aliphatic alcohols and water, wherein the concentration of resin is about 5 percent by weight. The NAFION solution is commercially available from the ALDRICH catalog as product number 27,470-4. The glassy carbon electrodes were 5 mm in diameter and were polished to a mirror finish. Glassy carbon electrodes are commercially available, for example, from Pine Instrument Company of Grove City, Pa. An aliquot of 10 µL of the catalyst suspension was added to the carbon substrate and allowed to dry at a temperature between about 60 and 70° C. The resulting layer of NAFION and catalyst was less than about 0.2 µm thick. This method produced slightly different platinum loadings for each electrode made with a particular suspension, but the variation was determined to be less than about 10 percent by weight.

After being dried, the rotating disk electrode was immersed into an electrochemical cell comprising an aqueous 0.5 M $H_2SO_4$ electrolyte solution maintained at room temperature. Before performing any measurements, the electrochemical cell was purged of oxygen by bubbling argon through the electrolyte for about 20 minutes. All measurements were taken while rotating the electrode at about 2000 rpm, and the measured current densities were normalized either to the glassy carbon substrate area or to the platinum loading on the electrode. Two groups of tests were performed to screen the activity of the supported catalysts. The first group of tests comprised cyclic voltammetric measurements while purging the electrolyte with argon. Specifically, the first group comprised:

a. two consecutive potential sweeps starting from OCP to about +0.35V then to about −0.65V and back to OCP at a rate of about 50 mV/s;

b. two hundred consecutive potential sweeps starting from OCP to about +0.35V then to about −0.65V and back to OCP at a rate of about 200 mV/s; and c. two consecutive potential sweeps starting from OCP to about +0.35V then to about −0.65V and back to OCP at a rate of about 50 mV/s.

The second test comprised purging with oxygen for about 15 minutes followed by a potential sweep test for oxygen reduction while continuing to purge the electrolyte with oxygen. Specifically, potential sweeps from about −0.45 V to +0.35 V were performed at a rate of about 5 mV/s to evaluate the initial activity of the catalyst as a function of potential and to create a geometric current density plot. The catalysts were evaluated by comparing the diffusion corrected activity at 0.15 V. All the foregoing test voltages are with reference to a mercury/mercury sulfate electrode. Also, it is to be noted that the oxygen reduction measurements for a glassy carbon RDE without a catalyst did not show any appreciable activity within the potential window.

The above-described supported catalyst compositions were evaluated in accordance with the above-described method and the results are set forth in Table C. Referring to the results therein, it is to be noted that numerous catalyst alloy compositions exhibited oxygen reduction activities greater than that of the carbon supported platinum standard, including for example the compositions of $Pt_{20}Cr_{20}Cu_{60}$ and $Pt_{28}Cr_5Cu_{67}$ (HFC 112, 130 and 289). The results of the evaluation also indicate, among other things, that it may take numerous iterations to develop a set of parameters for producing the target catalyst alloy composition. Also evidenced by the data is that activity may be adjusted by changes in the processing conditions.

Further, without being held to a particular theory, it is presently believed that differences in activity for similar catalyst compositions may be due to several factors such as homogeneity (e.g., an alloy, as defined herein, may have regions in which the constituent atoms show a presence or lack of order, i.e., regions of solid solution within an ordered lattice, or some such superstructure), changes in the lattice parameter due to changes in the average size of component atoms, changes in particle size, and changes in crystallographic structure/symmetry. The ramifications of structure and symmetry changes are often difficult to predict. For example, in the Pt—Cr system, as the amount of chromium added to platinum increases, the lattice of the resulting alloy may be expected to change from a cubic face centered lattice (100% Pt) to a tetragonal primitive lattice (PtCr). Within the Pt—Cu or Pt—Ni system, however, extended solid solutions are expected to form with little to any change in crystallographic symmetry. In the ternary Pt—Cr—Cu or Pt—Cr—Ni system, some combination of both behaviors may be expected however differences in size or electronic considerations make it difficult to predict exactly what may occur. Without being held to a particular theory, the possibility exists that as the relative ratio of copper and chromium to platinum goes from 0 to 1 a solid solution first occurs, i.e., Cu/Cr and Pt may mix randomly within some concentration limits, or under some specific synthesis conditions, and out of this solid solution an ordered phase may gradually crystallize, e.g., $Pt_3Cr$ or $Pt_3Cu$, only to return to a solid solution (disordered alloy) and again back to an ordered phase as the formula PtCr or PtCu is achieved.

Symmetry changes (e.g., those associated with the changes from a cubic face-centered structure to a primitive tetragonal structure, for example) may result in significant changes in the X-ray diffraction pattern. In some instances, these changes may be influenced by changes in the temperature of synthesis. Additionally, these changes may also be accompanied by more subtle changes in lattice parameters that may be indicative of the resulting changes in the size of the respective metal constituents. For example, the 12-coordinate metallic radii of platinum, chromium, nickel, and copper are 1.39 Å, 1.29 Å, 1.25 Å, and 1.28 Å, respectively, and as chromium is substituted for platinum, the average metal radius, and consequently the observed lattice parameter, may be expected to shrink accordingly. The average radius may thus be used as an indicator of lattice changes as a function of stoichiometry, or alternatively, as an indicator of stoichiometry based on observed diffraction patterns. It should be noted, however, that while average radii may be useful as a general rule, experimental results should be expected to conform only in a general manner because local ordering, significant size disparity between atoms, significant changes in symmetry, and other factors may produce values that are inconsistent with expectations. Occasionally the use of alternative metallic radii may be useful. One such alternative radius concept approximates metal radii using known crystallographically ordered Pt-based alloys such as $Pt_3Cr$, PtNi or PtCu (in both cases, cubic symmetry is maintained) instead of pure metals. In this case, the same close-packed geometric arguments are relevant with the exception that the lattice parameter of the ordered metal alloy is used in conjunction with the accepted 12-coordinate metallic radius of platinum, supra. Using these concepts, effective radii of chromium, nickel and copper are 1.30 Å, 1.262 Å, and 1.295 Å, respectively.

An interpretation of XRD analyses for some of the foregoing supported catalyst alloys is set forth below. Interpretation of XRD analyses can be subjective, and therefore, the following conclusions are not intended to be limiting.

$Pt_{20}Cr_{20}Cu_{60}$ (HFC 111 and 112): The predicted change in average radius based on the targeted stoichiometry was a decrease of approximately 5.2% versus platinum. XRD measurements of HFC 111 and 112, however, indicated slightly smaller decreases (3.1% and 4.5%, respectively) compared to platinum. HFC 111 displayed a significant copper impurity resulting in a larger than predicted lattice parameters. Ordering was apparent in both samples. HFC 112 displayed higher crystallinity however no impurity was present. In this case it appears that complete or nearly complete reduction to the metallic state may be desirable for electrochemical performance. Full reduction to the metallic state, using the co-precipitation method, was only achieved at the expense of high crystallinity and an increase in particle size.

$Pt_{20}Cr_{20}Ni_{60}$ (HFC 113 and 114): The predicted change in average radius based on the targeted stoichiometry was a decrease of approximately 6.6% versus platinum. XRD measurements of HFC 113 and 114, however, indicated slightly smaller decreases (4.2% and 5.2%, respectively) compared to platinum. Both HFC 113 and 114 displayed a significant nickel impurity resulting in larger than predicted lattice parameters. Ordering was apparent in both samples. HFC 114 displayed a greater crystallinity and less nickel than HFC 113. If a complete reduction to the metallic state is desirable for enhanced electrochemical performance, the nickel impurity may explain the values in Table E. Specifically, the reduction to the metallic state using the co-precipitation method, appears to be more difficult when the catalyst comprises nickel instead of copper.

$Pt_{22}Cr_{22}Cu_{44}Ni_{12}$ (HFC 117 and 118): The predicted change in average radius based on the targeted stoichiometry was a decrease of approximately 5.3% versus platinum. XRD measurements of HFC 117 and 118, however, indicated slightly smaller decreases (4.6%) compared to platinum. Both HFC 117 and 118 displayed a significant transition metal impurity resulting in larger than predicted lattice parameters. Ordering was apparent in both samples. Similar amounts of impurity phase were present in both samples.

$Pt_{20}Cr_{20}Cu_{60}$ (HFC 130 and 131): The predicted change in average radius based on the targeted stoichiometry was a decrease of approximately 5.2% versus platinum. XRD measurements of HFC 130 indicated the expected decrease of 5.2% compared to platinum. Ordering was apparent and no impurities were seen in HFC 130. Perhaps due to the higher reduction reactivity of the freeze dried method, HFC 131 appeared to have phase separated after the 900° C. heat treatment. In this case, two fairly crystalline phases were seen, one relatively rich in platinum and the other relatively poor in platinum. Both the lack of phase purity and the higher crystallinity may be responsible for the performance of HFC 131 seen in Table E.

$Pt_{28}Cr_5Cu_{67}$ (HFC 289 and 292): The predicted change in average radius based on the targeted stoichiometry was a decrease of approximately 4.7% versus platinum. XRD measurements of HFC 289 and 292 indicated a decrease of approximately 4.9% compared to platinum. Ordering was apparent and no impurities were seen in either HFC 289 or 292. HFC 292 had a higher degree of crystallinity which may be the reason for the electrochemical differences seen in Table E.

In view of the foregoing, for a particular catalyst composition a determination of the optimum conditions is preferred to produce the highest activity for that particular composition. In fact, for certain catalyst compositions, different structural characteristics may define what exactly may be described as a "good" catalyst. These characteristics may include differences in the composition (as viewed by lattice parameter), crystallinity, crystallographic ordering and/or particle size. These characteristics are not necessarily predictable and may depend on a complex interplay between starting materials, synthesis method, synthesis temperature and composition. For example, the starting materials used to synthesize the catalyst alloy may play a role in the activity of the synthesized alloy. Specifically, using something other than a metal nitrate salt solution to supply the metal atoms may result in different activities. Additionally, alternative Pt sources may be employed. Freeze-drying and heat treatment parameters such as atmosphere, time, temperature, etc. may also require optimization. This optimization may be compositionally dependent. Additionally, this optimization may involve balancing competing phenomena. For example, increasing the heat treatment temperature is generally known to improve the reduction of a metal salt to a metal, which typically increases activity; but it also tends to increase the size of the catalyst alloy particle and decrease surface area, which decreases electrocatalytic activity.

It is to be understood that the above description is intended to be illustrative and not restrictive. Many embodiments will be apparent to those of skill in the art upon reading the above description. The scope of the invention should therefore be determined not with reference to the above description alone, but should be determined with reference to the claims and the full scope of equivalents to which such claims are entitled.

When introducing elements of the present invention or an embodiment thereof, the articles "a", "an", "the" and "said" are intended to mean that there are one or more of the elements. The terms "comprising", "including" and "having" are intended to be inclusive and mean that there may be additional elements other than the listed elements.

The recitation of numerical ranges by endpoints includes all numbers subsumed within that range. For example, a range described as being between 1 and 5 includes 1, 1.6, 2, 2.8, 3, 3.2, 4, 4.75, and 5.

What is claimed is:

1. A catalyst for use in oxidation or reduction reactions comprising platinum, chromium, copper and nickel, wherein the concentration of platinum is at least about 2 atomic percent and less than 40 atomic percent.

2. The catalyst of claim 1 wherein the platinum concentration is no greater than about 35 atomic percent.

3. The catalyst of claim 1 wherein the chromium concentration is no greater than about 55 atomic percent.

4. The catalyst of claim 1 wherein the catalyst consists essentially of platinum, chromium, copper and nickel.

5. The catalyst of claim 1 wherein the catalyst comprises an alloy of platinum, chromium, copper and nickel.

6. The catalyst of claim 1 wherein the catalyst consists essentially of an alloy of platinum, chromium, copper and nickel.

7. The catalyst of claim 1 wherein the platinum concentration is at least about 5 atomic percent.

8. A catalyst for use in oxidation or reduction reactions, the catalyst comprising platinum, chromium, and nickel, wherein the platinum concentration is between about 15 atomic percent and about 40 atomic percent, the chromium concentration is between about 5 and about 25 atomic percent, and the concentration of nickel is between about 45 and about 70 atomic percent.

9. A catalyst for use in oxidation or reduction reactions, the catalyst comprising platinum, chromium, and copper, nickel, or a combination thereof, wherein the platinum concentration is between about 20 and about 35 atomic percent, the chromium concentration is between about 5 and about 25 atomic percent, and the concentration of copper, nickel or a combination thereof is between about 50 and about 65 atomic percent.

10. A catalyst for use in oxidation or reduction reactions, the catalyst comprising platinum, chromium, and copper, nickel, or a combination thereof, wherein the platinum concentration is between about 20 and about 30 atomic percent, the chromium concentration that is between about 5 and about 25 atomic percent, and the concentration of copper, nickel or a combination thereof is between about 50 and about 65 atomic percent.

11. A catalyst for use in oxidation or reduction reactions, the catalyst comprising platinum, chromium, and nickel, wherein the concentration of platinum is less than 40 atomic percent, the concentration of chromium is between about 5 and about 45 atomic percent, and the concentration of nickel is between about 15 and about 50 atomic percent.

12. The catalyst of claim 11 wherein the platinum concentration is no greater than about 35 atomic %.

13. The catalyst of claim 11 wherein the chromium concentration is between about 5 and about 35 atomic percent.

14. The catalyst of claim 11 wherein the platinum concentration is at least about 5 atomic percent.

15. A supported electrocatalyst powder for use in electrochemical reactor devices, the supported electrocatalyst powder comprising a catalyst comprising platinum at a concentration of at least about 2 atomic percent and less than 40 atomic percent, chromium at a concentration of no greater than 30 atomic percent, and nickel at a concentration of at least 35 atomic %, and electrically conductive support particles upon which the catalyst is dispersed.

16. The supported electrocatalyst powder of claim 15 wherein the platinum concentration is at least about 5 atomic percent.

17. A supported electrocatalyst powder for use in electrochemical reactor devices, the supported electrocatalyst powder comprising a catalyst comprising platinum at a concentration of at least about 2 atomic percent and less than 40 atomic percent, chromium at a concentration of no greater than 30 atomic percent, and nickel at a concentration of at least 45 atomic %, and electrically conductive support particles upon which the catalyst is dispersed.

18. The supported electrocatalyst powder of claim 17 wherein the platinum concentration is at least about 5 atomic percent.

19. A supported electrocatalyst powder for use in electrochemical reactor devices, the supported electrocatalyst powder comprising a catalyst comprising platinum at a concentration of at least about 2 atomic percent and less than 40 atomic percent, chromium, copper, and nickel, and electrically conductive support particles upon which the catalyst is dispersed.

20. The supported electrocatalyst powder of claim 19 wherein the platinum concentration is at least about 5 atomic percent.

21. A supported electrocatalyst powder for use in electrochemical reactor devices, the supported electrocatalyst powder comprising a catalyst comprising platinum at a concentration of at least about 2 atomic percent and less than 40 atomic percent, chromium at a concentration of no greater than 30 atomic percent, and nickel, and electrically conductive support particles upon which the catalyst is dispersed.

22. The supported electrocatalyst powder of claim 21 wherein the platinum concentration is at least about 5 atomic percent.

23. A supported electrocatalyst powder for use in electrochemical reactor devices, the supported electrocatalyst powder comprising a catalyst comprising platinum at a concentration of at least about 2 atomic percent and less than 40 atomic percent, chromium, and nickel at a concentration of at least 35 atomic percent, and electrically conductive support particles upon which the catalyst is dispersed.

24. The supported electrocatalyst powder of claim 23 wherein the platinum concentration is at least about 5 atomic percent.

25. A supported electrocatalyst powder for use in electrochemical reactor devices, the supported electrocatalyst powder comprising a catalyst comprising platinum, chromium, and nickel, wherein the platinum has a concentration of at least about 2 atomic percent and less than 40 atomic percent, and electrically conductive support particles upon which the catalyst is dispersed.

26. The supported electrocatalyst powder of claim 25 wherein the platinum concentration is at least about 5 atomic percent.

* * * * *